United States Patent
Nakamura et al.

(10) Patent No.: US 6,255,446 B1
(45) Date of Patent: Jul. 3, 2001

(54) RUBBER COMPOSITION

(75) Inventors: Masao Nakamura; Yukio Takagishi, both of Kawasaki; Katsumi Inagaki, Yokohama, all of (JP)

(73) Assignee: Nippon Zeon Co., Ltd., Tokyo (JP)

( * ) Notice: Subject to any disclaimer, the term of this patent is extended or adjusted under 35 U.S.C. 154(b) by 0 days.

(21) Appl. No.: 09/546,715

(22) Filed: Apr. 10, 2000

Related U.S. Application Data

(62) Division of application No. 09/147,136, filed as application No. PCT/JP97/01333 on Apr. 17, 1997, now Pat. No. 6,075,092.

(30) Foreign Application Priority Data

Apr. 17, 1996 (JP) .................................................. 8-119689

(51) Int. Cl.$^7$ .................................................. C08G 65/02
(52) U.S. Cl. .................................................. 528/393
(58) Field of Search .............................................. 528/393

(56) References Cited

U.S. PATENT DOCUMENTS

| | | | |
|---|---|---|---|
| H1387 | 12/1994 | Hansen | 525/92 |
| H1735 | 6/1998 | Hansen | 524/505 |
| 4,154,712 | 5/1979 | Lee | 260/291 |
| 4,252,913 | 2/1981 | Katchman | 525/93 |
| 4,415,649 | 11/1983 | Munger | 430/271 |
| 4,694,067 | * 9/1987 | Maeda | 528/393 |
| 4,894,409 | 1/1990 | Shimada et al. | |
| 5,089,554 | 2/1992 | Bomo et al. | |
| 5,409,969 | 4/1995 | Hamada | |
| 5,750,622 | 5/1998 | Himes | 525/92 |

FOREIGN PATENT DOCUMENTS

| | | |
|---|---|---|
| 0 779 330 A1 | 8/1997 | (EP) . |
| 2 164 692 | 8/1973 | (FR) . |
| 43-2945 | 2/1943 | (JP) . |
| 35-15797 | 4/1960 | (JP) . |
| 36-3394 | 10/1961 | (JP) . |
| 45-7751 | 3/1970 | (JP) . |
| 46-27534 | 8/1971 | (JP) . |
| 5-230286 | 9/1973 | (JP) . |
| 56-17362 | 2/1981 | (JP) . |
| 56-143209 | 11/1981 | (JP) . |
| 56-51171 | 12/1981 | (JP) . |
| 57-55912 | 4/1982 | (JP) . |
| 58-162605 | 9/1983 | (JP) . |
| 59-140211 | 8/1984 | (JP) . |
| 59-191705 | 10/1984 | (JP) . |
| 60-137913 | 7/1985 | (JP) . |
| 61-58488 | 3/1986 | (JP) . |
| 61-130355 | 6/1986 | (JP) . |
| 61-130356 | 6/1986 | (JP) . |
| 62-62838 | 3/1987 | (JP) . |
| 62-86074 | 4/1987 | (JP) . |
| 62-109801 | 5/1987 | (JP) . |
| 62-112653 | 5/1987 | (JP) . |
| 62-149708 | 7/1987 | (JP) . |
| 63-64444 | 12/1988 | (JP) . |
| 64-22940 | 1/1989 | (JP) . |
| 1-101344 | 4/1989 | (JP) . |
| 1-188501 | 7/1989 | (JP) . |
| 1-261436 | 10/1989 | (JP) . |
| 3-52986 | 3/1991 | (JP) . |
| 3-252431 | 11/1991 | (JP) . |
| 3-252433 | 11/1991 | (JP) . |
| 4-272944 | 9/1992 | (JP) . |
| 4-275347 | 9/1992 | (JP) . |
| 4-71946 | 11/1992 | (JP) . |
| 5-230290 | 9/1993 | (JP) . |
| 5-62147 | 9/1993 | (JP) . |
| 5-88897 | 12/1993 | (JP) . |
| 5-88898 | 12/1993 | (JP) . |
| 6-18933 | 3/1994 | (JP) . |
| 6-199921 | 7/1994 | (JP) . |
| 6-248116 | 9/1994 | (JP) . |
| 7-164571 | 6/1995 | (JP) . |
| 7-188356 | 7/1995 | (JP) . |
| 7-84564 | 9/1995 | (JP) . |

* cited by examiner

*Primary Examiner*—Paul R. Michl
(74) *Attorney, Agent, or Firm*—Armstrong, Westerman, Hattori, McLeland & Naughton, LLP

(57) ABSTRACT

The invention provides a rubber composition comprising 100 parts by weight of a diene rubber (i) and 0.1 to 25 parts by weight of a polyether-based polymer (ii).

6 Claims, No Drawings

RUBBER COMPOSITION

This application is a divisional of prior application Ser. No. 09/147,136 filed as PCT/JP97/01333, Apr. 17, 1997, now U.S. Pat. No. 6,075,092.

TECHNICAL FIELD

The present invention relates to rubber compositions, and more particularly to rubber compositions having excellent heat build-up resistance, tensile strength and processability. The rubber compositions according to the present invention have low heat build-up and are thus suitable for use as rubber materials for automobile tires low in rolling resistance. The present invention also relates to novel polyether-based polymers useful as raw materials for the rubber compositions having such excellent various properties.

BACKGROUND ART

As much importance has been attached to saving in resources and countermeasures to environment in recent years, requirements to reduce fuel consumption of automobiles have been increasingly severe. Automobile tires have also been required to low their rolling resistance so as to contribute to reduction in the fuel consumption. In order to low the rolling resistance of tires, it is generally effective to use a rubber material capable of providing a vulcanized rubber having low heat build-up as a rubber material for the tires.

In general, rubber compositions in which carbon black is compounded into a diene rubber such as natural rubber (NR), polybutadiene (BR), polyisoprene (IR) or styrene-butadiene copolymer rubber (SBR) are widely used as rubber materials for tires. However, the rubber compositions obtained by compounding carbon black into the diene rubber have insufficient heat build-up resistance.

It has heretofore been proposed to use, as a rubber material for tires, a rubber composition with silica compounded in place of carbon black as a reinforcing agent into a diene rubber so as to improve heat build-up resistance. However, the silica-compounded rubber composition has involved problems that since its processability is poorer compared with the carbon black-compounded rubber composition, the heat build-up resistance cannot be sufficiently developed, and that it is insufficient in tensile strength and the like. A cause for these problems is considered to be attributed to the fact that the affinity of the silica for the diene rubber is lower than that of the carbon black, so that the processability becomes poor, and a reinforcing effect cannot be sufficiently developed.

In order to enhance the affinity of the silica for the diene rubber, it has heretofore been proposed to use a silane coupling agent (Japanese Patent Application Laid-Open Nos. 252431/1991 and 252433/1991, etc.). However, the mere use of the silane coupling agent is not yet sufficient for the improving effect on heat build-up resistance, tensile strength and processability.

In order to enhance the affinity of the silica for the diene rubber, it has also been investigated to use a diene rubber with a substituent group having high affinity for silica introduced therein. For example, a diene rubber with a tertiary amino group introduced therein has been proposed for a diene rubber according to an emulsion polymerization process (Japanese Patent Application Laid-Open No. 101344/1989). Besides, a diene rubber with a substituent group having a polar group, such as an alkylsilyl group (Japanese Patent Application Laid-Open No. 188501/1989), a halogenated silyl group (Japanese Patent Application Laid-Open No. 230286/1993) or a substituted amino group (Japanese Patent Application Laid-Open No. 22940/1989) introduced therein has been proposed for a diene rubber according to an anionic polymerization process. However, the diene rubbers with these substituent groups having a polar group introduced therein have demerits that their processability is poor upon blending with silica, and their properties such as heat build-up resistance and tensile strength are not sufficiently improved.

On the other hand, with respect to polyether-based polymers, rubbery or resinous polymers have been known. As examples of rubber compositions comprising a polyether-based polymer as a main component, there have been reported a rubber composition comprising 70 parts by weight of an epichlorohydrin-allyl glycidyl ether copolymer rubber and 30 parts by weight of a low-nitrile rubber, which has excellent paper-feed performance and is useful for platen rolls (Japanese Patent Application Laid-Open No. 261436/1989), a rubber composition comprising 50 to 70 wt. % of epichlorohydrin rubber and 50 to 30 wt. % of butadiene rubber, which has excellent charging property and is suitable for use in charging rollers (Japanese Patent Application Laid-Open No. 164571/1995) a conductive rubber composition comprising epihalohydrin rubber and silica (Japanese Patent Application Laid-Open No. 112653/1987), a rubber composition comprising epichlorohydrin rubber and hydrous silicic acid, which has excellent rancidity resistance and is suitable for use in hoses (Japanese Patent Publication No. 71946/1992), and a rubber composition comprising an epichlorohydrin-propylene oxide copolymer rubber and hydrous silicic acid and having excellent oil resistance, ozone resistance and low-temperature resistance (Japanese Patent Publication No. 62147/1993). Besides, as examples of polyether-based polymers useful as modifiers, there have been reported a copolymer of ethylene oxide and epichlorohydrin, which improves the static electricity-discharging properties of resins such as polyolefins (Japanese Patent Application Laid-Open No. 52986/1991), and an epihalohydrin copolymer rubber which improves the antistatic properties of plastic materials such as ABS resins (Japanese Patent Publication No. 84564/1995). However, these polyether-based polymers have heretofore not been known to have an excellent modifying effect on rubber compositions comprising diene rubber and silica.

DISCLOSURE OF THE INVENTION

It is an object of the present invention to provide a rubber composition which exhibits excellent heat build-up resistance (low heat build-up), which is taken as an index to rolling resistance, and also has good tensile strength and processability, even when silica is compounded thereinto.

Another object of the present invention is to provide a rubber composition which comprises a diene rubber and silica as a reinforcing agent, and has excellent heat build-up resistance, tensile strength and processability.

A further object of the present invention is to provide a novel polyether-based polymer useful as a raw material for the rubber compositions having such excellent various properties.

The present inventors have carried out an extensive investigation with a view toward overcoming the above-described problems involved in the prior art. As a result, it has been found that when a specific amount of a polyether-based polymer is compounded into a diene rubber, a rubber composition exhibiting excellent processability with silica and also having excellent heat build-up resistance and tensile strength can be provided.

The polyether-based polymer is preferably a copolymer of at least two alkylene oxides, or a copolymer of an alkylene oxide and an unsaturated epoxide. The copolymer of an alkylene oxide and an unsaturated epoxide is preferably a copolymer of at least two alkylene oxides and an unsaturated epoxide. In particular, an ethylene oxide-propylene oxide-unsaturated epoxide terpolymer is more preferred. This terpolymer is a novel polymer.

According to the present invention, there is thus provided a rubber composition comprising 100 parts by weight of a diene rubber (i) and 0.1 to 25 parts by weight of a polyether-based polymer (ii).

According to the present invention, there is also provided a rubber composition further comprising silica in addition to the above-described rubber composition.

According to the present invention, there is further provided an ethylene oxide-propylene oxide-unsaturated epoxide terpolymer composed of 50 to 98.9 wt. % of ethylene oxide, 1 to 35 wt. % of propylene oxide and 0.1 to 15 wt. % of an unsaturated epoxide.

BEST MODE FOR CARRYING OUT THE INVENTION

Diene Rubber (i)

No particular limitation is imposed on the diene rubber (i) so far as it is a homopolymer of a conjugated diene, a copolymer of at least two conjugated dienes, or a rubbery copolymer of at least one conjugated diene and another monomer copolymerizable with the conjugated diene. However, the diene rubber is desirably a (co)polymer the content of conjugated diene units of which is generally at least 40 wt. %, preferably within a range of from 50 to 100 wt. %, more preferably from 55 to 100 wt. %.

In the present invention, it is preferred to use a diene rubber (i-A) having a polar group in its molecule, from the viewpoint of balancing among properties of heat build-up resistance, tensile strength and processability at a high level. No particular limitation is imposed on the polar group in the polar group-containing diene rubber (i-A). However, a polar group containing a heteroatom is preferably used. Examples of the heteroatom include atoms belonging to Groups 5B and 6B of the second to forth periods in the periodic table, for example, nitrogen, oxygen, sulfur and phosphorus atoms. Of these, the nitrogen and oxygen atoms are preferred. Specific examples of the heteroatom-containing polar group include hydroxyl, oxy, carboxyl, carbonyl, oxycarbonyl, sulfide, disulfide, sulfonyl, sulfinyl, thiocarbonyl, imino, amino, nitrile, ammonium, imide, amide, hydrazo, azo and diazo groups. Of these, the hydroxyl, oxy, sulfide, disulfide, imino and amino groups are preferred, and the hydroxyl, amino and oxy groups are more preferred. The hydroxyl and amino groups are most preferred.

Examples of the diene rubber (i-A) containing such a polar group include ① polar group-containing diene rubber (i-A-1) with a polar group bonded to a portion of a diene polymer containing conjugated diene monomer units and optionally units of another copolymerizable monomer, preferably to a terminal of its molecular chain, and ② diene rubber (i-A-2) containing conjugated diene monomer units, polar group-containing vinyl monomer units and optionally units of another copolymerizable monomer.

Examples of the conjugated diene include 1,3-butadiene, 2-methyl-1,3-butadiene, 2,3-dimethyl-1,3-butadiene, 2-chloro-1,3-butadiene and 1,3-pentadiene. Of these, 1,3-butadiene and 2-methyl-1,3-butadiene are preferred, with 1,3-butadiene being particularly preferred. These conjugated dienes may be used either singly or in any combination thereof.

No particular limitation is imposed on the polar group-containing vinyl monomer so far as it is a polymerizable monomer which contains at least one polar group in its molecule. Specific examples thereof include amino group-containing vinyl monomers, hydroxyl group-containing vinyl monomers and oxy group-containing vinyl monomers. The hydroxyl group-containing vinyl monomers and amino group-containing vinyl monomers are preferred. These polar group-containing vinyl monomers may be used either singly or in any combination thereof.

Examples of the amino group-containing vinyl monomers include polymerizable monomers having at least one amino group selected from the group consisting of primary, secondary and tertiary amino groups in their molecules. Of these, tertiary amino group-containing vinyl monomers are particularly preferred. These amino group-containing vinyl monomers may be used either singly or in any combination thereof.

Examples of the primary amino group-containing vinyl monomers include acrylamide, methacrylamide, p-aminostyrene, aminomethyl (meth)acrylate, aminoethyl (meth)acrylate, aminopropyl (meth)acrylate and aminobutyl (meth)acrylate.

Examples of secondary amino group-containing vinyl monomers include anilinostyrenes disclosed in Japanese Patent Application Laid-Open No. 130355/1986; anilinophenylbutadienes disclosed in Japanese Patent Application Laid-Open No. 130356/1986; and N-monosubstituted (meth)acrylamides such as N-methyl (meth)acrylamide, N-ethyl (meth)acrylamide, N-methylolacrylamide and N-(4-anilinophenyl) methacrylamide.

Examples of tertiary amino group-containing vinyl monomers include N,N-disubstituted aminoalkyl acrylates, N,N-disubstituted aminoalkyl acrylamides, N,N-disubstituted amino-aromatic vinyl compounds and vinyl compounds having a pyridyl group.

Examples of the N,N-disubstituted amino acrylates include esters of acrylic acid or methacrylic acid, such as N,N-dimethylaminomethyl (meth)acrylate, N,N-dimethylaminoethyl (meth)acrylate, N,N-dimethylaminopropyl (meth)acrylate, N,N-dimethylaminobutyl (meth)acrylate, N,N-diethylaminoethyl (meth)acrylate, N,N-diethylaminopropyl (meth)acrylate, N,N-diethylaminobutyl (meth)acrylate, N-methyl-N-ethylaminoethyl (meth)acrylate, N,N-dipropylaminoethyl (meth)acrylate, N,N-dibutylaminoethyl (meth)acrylate, N,N-dibutylaminopropyl (meth)acrylate, N,N-dibutylaminobutyl (meth)acrylate, N,N-dihexylaminoethyl (meth)acrylate, N,N-dioctylaminoethyl (meth)acrylate and acryloylmorpholine. Of these, N,N-dimethylaminoethyl (meth)acrylate, N,N-diethylaminoethyl (meth)acrylate, N,N-dipropylaminoethyl (meth)acrylate, N,N-dioctylaminoethyl (meth)acrylate and N-methyl-N-ethylaminoethyl (meth)acrylate.

Examples of the N,N-disubstituted aminoalkyl acrylamides include acrylamide compounds or methacrylamide compounds such as N,N-dimethylaminomethyl (meth) acrylamide, N,N-dimethylaminoethyl (meth)acrylamide, N,N-dimethylaminopropyl (meth)acrylamide, N,N-dimethylaminobutyl (meth)acrylamide, N,N-diethylaminoethyl (meth)acrylamide, N,N-diethylaminopropyl (meth)acrylamide, N,N-diethylaminobutyl (meth)acrylamide, N-methyl-N-ethylaminoethyl (meth)acrylamide, N,N- dipropylaminoethyl (meth)acrylamide, N,N-dibutylaminoethyl (meth)acrylamide, N,N-dibutylaminopropyl (meth)acrylamide, N,N-dibutylaminobutyl (meth)acrylamide, N,N-dihexylaminoethyl (meth)acrylamide, N,N-dihexylaminopropyl (meth)acrylamide and N,N-dioctylaminopropyl (meth)acrylamide. Of these, N,N-dimethylaminopropyl (meth)acrylamide, N,N-diethylaminopropyl (meth)acrylamide and N,N-dioctylaminopropyl (meth)acrylamide are preferred.

Example of the N,N-disubstituted amino-aromatic vinyl compounds include styrene derivatives such as N,N-dimethylaminoethylstyrene, N,N-diethylaminoethylstyrene, N,N-dipropylaminoethylstyrene and N,N-dioctylaminoethylstyrene.

Examples of the pyridyl group-containing vinyl compounds include 2-vinylpyridine, 4-vinylpyridine, 5-methyl-2-vinylpyridine and 5-ethyl-2-vinylpyridine. Of these, 2-vinylpyridine and 4-vinylpyridine are preferred.

Examples of the hydroxyl group-containing vinyl monomers include polymerizable monomers having at least one primary, secondary or tertiary hydroxyl group in their molecules. Examples of such hydroxyl group-containing vinyl monomers include unsaturated carboxylic acid monomers, vinyl ether monomers and vinyl ketone monomers each having a hydroxyl group. Of these, the hydroxyl group-containing unsaturated carboxylic acid monomers are preferred. Examples of the hydroxyl group-containing unsaturated carboxylic acid monomers include derivatives such as esters, amides and anhydrides of $\alpha,\beta$-unsaturated carboxylic acids such as acrylic acid, methacrylic acid, itaconic acid, fumaric acid and maleic acid. The ester compounds of acrylic acid, methacrylic acid and the like are preferred.

Specific examples of the hydroxyl group-containing vinyl monomers include hydroxymethyl (meth)acrylate, 2-hydroxyethyl (meth)acrylate, 2-hydroxypropyl (meth)acrylate, 3-hydroxypropyl (meth)acrylate, 3-chloro-2-hydroxypropyl (meth)acrylate, 3-phenoxy-2-hydroxypropyl (meth)acrylate, glycerol mono-(meth)acrylate, hydroxybutyl (meth)acrylate, 2-chloro-3-hydroxypropyl (meth) acrylate, hydroxyhexyl (meth)acrylate, hydroxyoctyl (meth) acrylate, hydroxymethyl (meth)acrylamide, 2-hydroxypropyl (meth)acrylamide, 3-hydroxypropyl (meth)acrylamide, di-(ethylene glycol)itaconate, di-(propylene glycol)itaconate, bis(2-hydroxypropyl)itaconate, bis(2-hydroxyethyl) itaconate, bis(2-hydroxyethyl) fumarate, bis(2-hydroxyethyl) maleate, 2-hydrbxyethyl vinyl ether, hydroxymethyl vinyl ketone and allyl alcohol. Of these, hydroxymethyl (meth)acrylate, 2-hydroxyethyl (meth)acrylate, 2-hydroxypropyl (meth)acrylate, 3-hydroxypropyl (meth)acrylate, 3-phenoxy-2-hydroxypropyl (meth)acrylate, glycerol mono-(meth)acrylate, hydroxybutyl (meth)acrylate, hydroxyhexyl (meth) acrylate, hydroxyoctyl (meth)acrylate, hydroxymethyl (meth)acrylamide, 2-hydroxypropyl (meth)acrylamide and 3-hydroxypropyl (meth)acrylamide are preferred.

Examples of the oxy group-containing vinyl monomers include alkoxysilyl group-containing vinyl monomers disclosed in Japanese Patent Application Laid-Open Nos. 188501/1989 and 188356/1995, such as trimethoxyvinylsilane, triethoxyvinylsilane, tri(2-methylbutoxy)vinylsilane, 6-trimethoxysilyl-1,2-hexene, p-trimethoxysilylstyrene, triphenoxyvinylsilane, 3-trimethoxysilylpropyl methacrylate and 3-triethoxysilylpropyl acrylate.

These polar group-containing vinyl monomers may be used either singly or in any combination thereof.

No particular limitation is imposed on said another copolymerizable monomer so far as it does not impair the objects of the present invention. When much importance is attached to balance between heat build-up resistance and wet skid resistance, however, an aromatic vinyl is generally used. Examples of the aromatic vinyl include styrene, $\alpha$-methylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene and monofluorostyrene. Of these, styrene is preferred. These copolymerizable monomers may be used either singly or in any combination thereof.

The contents of the respective monomer units in the polar group-containing diene rubber (i-A) are suitably selected as necessary for the end application intended.

In the case where the polar group-containing diene rubber (i-A-1) with the polar group bonded to a portion of the polymer is a copolymer composed of a conjugated diene and another copolymerizable monomer, the contents of the respective monomers are as follows. The content of the conjugated diene bond units is generally within a range of from 45 to 95 wt. %, preferably from 50 to 90 wt. %, more preferably from 55 to 85 wt. %, while the content of the units of said another copolymerizable monomer (preferably aromatic vinyl bond units) is generally within a range of from 55 to 5 wt. %, preferably from 50 to 10 wt. %, more preferably from 45 to 15 wt. %.

The contents of the respective monomers in the polar group-containing diene rubber (i-A-2) obtained by copolymerizing a polar group-containing vinyl monomer are divided into the case of copolymerization of a conjugated diene and a polar group-containing vinyl monomer, and the case of copolymerization of a conjugated diene, a polar group-containing vinyl monomer and another copolymerizable monomer. In the case of the copolymer of the conjugated diene and the polar group-containing vinyl monomer, the content of the conjugated diene bond units is generally within a range of from 80 to 99.99 wt. %, preferably from 85 to 99.95 wt. %, more preferably from 90 to 99.9 wt. %, while the content of the polar group-containing monomer bond units is generally within a range of from 0.01 to 20 wt. %, preferably from 0.05 to 15 wt. %, more preferably from 0.1 to 10 wt. %. The contents of the respective monomer bond units in the case of the copolymer of the conjugated diene, the polar group-containing vinyl monomer and said another copolymerizable monomer are as follows. The content of the conjugated diene bond units is generally within a range of from 45 to 94.99 wt. %, preferably from 50 to 85 wt. %, more preferably from 55 to 80 wt. %, the content of the polar group-containing monomer bond units is generally within a range of from 0.01 to 20 wt. %, preferably from 0.05 to 15 wt. %, more preferably from 0.1 to 10 wt. %, and the content of the units of said another copolymerizable monomer is generally within a range of from 5 to 55 wt. %, preferably from 10 to 50 wt. %, more preferably from 15 to 45 wt. %.

These polar group-containing diene rubbers (i-A) can be prepared in accordance with a process known per se in the art. The polar group-containing diene rubber (i-A-1) with the polar group bonded to a portion of the polymer can be prepared by, for example, (1) a process (Preparation Process a) in which an active (co)polymer with an active metal bonded to a terminal of its polymer chain, which is obtained by (co)polymerizing a conjugated diene, or a conjugated diene and another copolymerizable monomer using an active organometallic compound as an initiator in a hydrocarbon solvent, is allowed to react with a modifying agent to introduce a polar group to the terminal of the polymer chain, or (2) a process (Preparation Process b) in which a conjugated diene, or a conjugated diene and another copolymerizable monomer are (co)polymerized using an active organometallic compound containing a polar group as an initiator in a hydrocarbon solvent. The polar group-containing diene rubber (i-A-2) can be prepared by, for example, (3) a process (Preparation Process c) in which a conjugated diene and a polar group-containing vinyl monomer, or a conjugated diene, a polar group-containing vinyl monomer and another copolymerizable monomer are copolymerized.

These preparation processes (a to c) will hereinafter be described in detail.

As the active organometallic compound used in Preparation Process a, there may be used that generally used in anionic polymerization. Examples thereof include organic alkali metal compounds, organic alkaline earth metal compounds and organic acid salts with rare earth metals of the lanthanoid series. Of these, the organic alkali metal compounds are preferred.

Examples of the organic alkali metal compounds include organic monolithium compounds such as n-butyllithium, sec-butyllithium, t-butyllithium, hexyllithium, phenyllithium and stilbene lithium; polyfunctional organic lithium compounds. such as dilithiomethane, 1,4-dilithiobutane, 1,4-dilithio-2-ethylcyclohexane and 1,3,5-trilithiobenzene; and sodium naphthalene and potassium naphthalene. Of these, the organollthium compounds are preferred, with the organic monolithium compounds being particularly preferred.

Examples of the organic alkaline earth metal compounds include n-butylmagnesium bromide, n-hexylmagnesium bromide, ethoxycalcium, calcium stearate, t-butoxystrontium, ethoxybarium, isopropoxybarium, ethylmercaptobarium, t-butoxybarium, phenoxybarium, diethylaminobarium, barium stearate and ethylbarium.

Examples of the organic acid salts with rare earth metals of the lanthanoid series include composite catalysts composed of neodymium versate/triethylaluminum hydride/ethylaluminum sesquichloride as described in Japanese Patent Publication No. 64444/1988.

These active organometallic compounds may be used either singly or in any combination thereof. The amount of the active organometallic compound used is suitably selected according to a molecular weight required of a polymer formed. However, it is generally within a range of from 0.01 to 20 millimoles, preferably from 0.05 to 15 millimoles, more preferably from 0.1 to 10 millimoles per 100 g of the whole monomer used.

The polymerization reaction using the active organometallic compound as an initiator is conducted in a hydrocarbon solvent which does not destroy the initiator. No particular limitation is imposed on a suitable hydrocarbon solvent so far as it is that used in usual solution polymerization, and examples thereof include aliphatic hydrocarbons such as n-butane, n-pentane, isopentane, n-hexane, n-heptane and isooctane; alicyclic hydrocarbons such as cyclopentane, cyclohexane and methylcyclopentane; and aromatic hydrocarbons such as benzene and toluene. Of these, n-hexane, cyclohexane and toluene are preferred. Besides, an unsaturated hydrocarbon having low polymerizability, such as 1-butene, cis-2-butene or 2-hexene, may be used as needed. These hydrocarbon solvents may be used either singly or in any combination thereof, generally, in such a proportion that the concentration of the monomers amounts to 1–30 wt. %.

In order to control the microstructure of the conjugated diene bond units or the distribution of the aromatic vinyl copolymerized with the conjugated diene in the copolymer chain upon the polymerization reaction, a Lewis base compound may be used. No particular limitation is imposed on the Lewis base compound so far as it is that used in usual anionic polymerization using the active organometallic compound as an initiator. Examples thereof include ethers such as tetrahydrofuran, diethyl ether, dioxane, ethylene glycol dimethyl ether, ethylene glycol dibutyl ether, diethylene glycol dimethyl ether and diethylene glycol dibutyl ether; tertiary amines such as tetramethylethylenediamine, trimethylamine, triethylamine, pyridine and quinuclidine; alkali metal alkoxides such as potassium-t-amyl oxide and potassium-t-butyl oxide; and phosphines such as triphenylphosphine. Of these, the ethers and tertiary amines are preferred.

These Lewis base compounds may be used either singly or in any combination thereof. The amount of the Lewis base compound used is generally within a range of from 0 to 200 moles, preferably from 0.1 to 100 moles, more preferably 0.5 to 50 moles, most preferably from 0.8 to 20 moles per mole of the initiator (active organometallic compound).

The polymerization reaction is carried out by (co)polymerizing the conjugated diene, or the conjugated diene and another copolymerizable monomer (preferably, the aromatic vinyl). As the conjugated diene and another copolymerizable monomer, at least two kinds of the respective monomers may be used in combination. When the conjugated diene and another copolymerizable monomer are used in combination, the proportions of the respective monomers in the whole monomer are as follows. The proportion of the conjugated diene is generally within a range of from 45 to 95 wt. %, preferably from 50 to 90 wt. %, more preferably from 55 to 85 wt. %, while the proportion of another copolymerizable monomer is generally within a range of from 55 to 5 wt. %, preferably from 50 to 10 wt. %, more preferably from 45 to 15 wt. %.

The polymerization reaction is generally conducted in a temperature range of from −78° C. to +150° C. under a polymerization style such as a batch process or a continuous process. In the case where the aromatic vinyl is copolymerized as another copolymerizable monomer, in order to enhance the randomness of aromatic vinyl units, it is desirable to continuously or intermittently supply the conjugated diene or a mixture of the conjugated diene and the aromatic vinyl to the reaction system in such a manner that the aromatic vinyl content in the compositional ratio of the aromatic vinyl to the conjugated diene in the polymerization system amounts to a specific concentration range as described in, for example, Japanese Patent Application Laid-Open Nos. 140211/1984 and 143209/1981.

As specific examples of the polymer formed by the polymerization reaction, may be mentioned polybutadiene, polyisoprene, butadiene-isoprene copolymers, styrene-butadiene copolymers, styrene-isoprene copolymers and styrene-butadiene-isoprene terpolymers. Thus, the polymer with the active metal bonded to the terminal of the polymer chain (i.e., the active polymer) is obtained.

The modifying agent capable of reacting with such an active polymer to introduce a polar group to the terminal of the polymer chain is known, and various kinds of modifying agents disclosed in, for example, Japanese Patent Application Laid-Open No. 191705/1984, 137913/1985, 86074/1987, 109801/1987, 149708/1987 and 22940/1989 may be used.

Specific examples of the modifying agent include a compound (hereinafter referred to as Modifying Agent X) having at least one reactive polar group such as a carbonyl, thiocarbonyl, aziridine or epoxy group in its molecule; and a compound (hereinafter referred to as Modifying Agent Y) having at least one reactive group reacting with an active metal, such as a carbonyl, thiocarbonyl, aziridine or epoxy group, a halogen atom, or a carbon-carbon unsaturated bond, and at least one of the above-described polar groups in its molecule.

Examples of Modifying Agent X include ketones such as acetone, benzophenone and acetylacetone; aldehydes such as benzaldehyde; oxiranes; carbodiimides; Schiff bases such as N-ethylethylideneimine, N-methylbenzylideneimine, N-hexylcinnamylideneimine, N-decyl-2-ethyl-1,2-diphenylbutylideneimine, N-phenylbenzylideneimine, N-dodecylcyclohexaneimine, N-propyl-2,5-cyclohexadieneimine and N-methyl-1-naphthaleneimine; and cyclic imine compounds having 2 or 3 carbon atoms. Of these, the oxiranes, carbodiimides and cyclic imine compounds having 2 or 3 carbon atoms.

Examples of the oxiranes include ethylene oxide, propylene oxide, 1,2-epoxybutane, 1,2-epoxy-iso-butane, 2,3-epoxybutane, 1,2-epoxyhexane, 1,2-epoxyoctane, 1,2-epoxydecane, 1,2-epoxytetradecane, 1,2-epoxyhexadecane, 1,2-epoxyoctadecane, 1,2-epoxyeicosane, 1,2-epoxy-2-pentylpropane, 3,4-epoxy-1-butene, 1,2-epoxy-5-hexene, 1,2-epoxy-9-decene, 1,2-epoxycyclopentane, 1,2-epoxycyclohexane, 1,2-epoxycyclododecane, 1,2-epoxyetylbenzene, 1,2-epoxy-1-methoxy-2-methylpropane, glycidyl methyl ether, glycidyl ethyl ether, glycidyl isopropyl ether, glycidyl allyl ether, glycidyl phenyl ether, glycidyl butyl ether, 2-(3,4-epoxycyclohexyl)ethyltrimethoxysilane, 3-glycidyloxypropyltrimethoxysilane, epichlorohydrin, epibromohydrin, epiiodohydrin, 2,3-epoxy-1,1,1-trifluoropropane and 1,2-epoxy-1H,1H,2H,3H,3H-heptadecafluoroundecane. Of these, ethylene oxide, propylene oxide, 1,2-epoxybutane, 1,2-epoxy-iso-butane, 2,3-epoxybutane, 1,2-epoxyhexane, 3,4-epoxy-1-butene, 1,2-epoxy-5-hexene, glycidyl methyl ether, glycidyl ethyl ether, glycidyl isopropyl ether, glycidyl allyl ether, glycidyl phenyl ether, glycidyl butyl ether, 3-glycidyloxypropyltrimethoxysilane, epichlorohydrin and epibromohydrin are preferred.

Examples of the carbodiimides include dimethylcarbodiimide, diethylcarbodiimide, dipropylcarbodiimide, dibutylcarbodiimide, dihexylcarbodiimide, dicyclohexylcarbodiimide, dibenzylcarbodiimide, diphenylcarbodiimide, methylpropylcarbodiimide, butylcyclohexylcarbodiimide, ethylbenzylcarbodiimide, propylphenylcarbodiimide and phenylbenzylcarbodiimide. Of these, dicyclohexylcarbodiimide and diphenylcarbodiimide are preferred.

Examples of the cyclic imine compounds having 2 or 3 carbon atoms include aziridines include N-unsubstituted aziridine compounds such as ethyleneimine and propyleneimine, and N-unsubstituted azetidine compounds such as trimethyleneimine.

Examples of Modifying Agent Y include compounds having a vinyl group and a hydroxyl group in their molecules; compounds having a vinyl group and an amino group in their molecules; compounds having a vinyl group and an alkoxysilyl group in their molecules; compounds having a halogen atom and an alkoxysilyl group in their molecules; and compounds having a carbonyl group and an amino group in their molecules. Of these, the compounds having a vinyl group and a hydroxyl group in their molecules, compounds having a vinyl group and an amino group in their molecules, compounds having a vinyl group and an alkoxysilyl group in their molecules, compounds having a halogen atom and an alkoxysilyl group in their molecules, and compounds having a carbonyl group and an amino group in their molecules are preferred, with the compounds having a carbonyl group and an amino group in their molecules being particularly preferred.

As examples of the compounds having a vinyl group, and a hydroxyl, amino or alkoxysilyl group in their molecules, may be mentioned the same compounds as those specifically mentioned above as the polar group-containing vinyl monomers.

Examples of the compounds having a vinyl group or a halogen atom, and an alkoxysilyl group in their molecules include monohalogenated alkoxysilanes such as trimethoxychlorosilane, triethoxychlorosilane, diethoxymethylchlorosilane, triphenoxychlorosilane and diphenoxyphenyliodosilane disclosed in Japanese Patent Application Laid-Open No. 188501/1989. These compounds may be used either singly or in any combination thereof. It is however necessary to determine the amount of the compounds added in such a manner that the functional group such as a vinyl group or halogen atom is present in an amount at least equivalent to the active metal.

In the compounds having a carbonyl group and an amino group in their molecule, preferably, the compounds having a carbonyl group and a tertiary amino group in their molecules, both groups may be adjacent to or separate from each other. Example of compounds having both groups in an adjoined relation include N-substituted amides, N-substituted imides, N-substituted ureas and N-substituted isocyanuric acids. Cyclic compounds having these functional groups are preferred. Examples of compounds having both groups in a separated relation include N-substituted aminoketones and N-substituted aminoaldehydes. The N-substituted aminoketones are preferred.

Examples of the N-substituted cyclic amides include N-methyl-β-propiolactam, N-phenyl-β-propiolactam, N-methyl-2-pyrrolidone, N-vinyl-2-pyrrolidone, N-phenyl-2-pyrrolidone, N-t-butyl-2-pyrrolidone, N-methyl-5-methyl-2-pyrrolidone, N-methyl-2-piperidone, N-vinyl-2-piperidone, N-phenyl-2-piperidone, N-methyl-ε-caprolactam, N-phenyl-ε-caprolactam, N-methyl-ω-laurylolactam and N-vinyl-ω-laurylolactam. Of these, N-methyl-2-pyrrolidone, N-vinyl-2-pyrrolidone, N-phenyl-2-pyrrolidone, N-methyl-piperidone, N-vinyl-2-piperidone, N-methyl-ε-caprolactam and N-phenyl-ε-caprolactam are preferred.

Examples of the N-substituted cyclic ureas include 1,3-dimethylethyleneurea, 1,3-divinylethyleneurea, 1,3-diethyl-2-imidazolidinone and 1-methyl-3-ethyl-2-imidazolidinone, with 1,3-dimethylethyleneurea and 1,3-divinylethyleneurea being preferred.

Examples of the N-substituted aminoketones include 4-N,N-dimethylaminoacetophenone, 4-N-methyl-N-ethylaminoacetophenone, 4-N,N-diethylaminoacetophenone, 1,3-bis(diphenylamino)-2-propanone, 1,7-bis(methylethylamino)-4-heptanone, 4-N,N-dimethylaminobenzophenone, 4-N,N-di-t-butylaminobenzophenone, 4-N,N-diphenylaminobenzophenone, 4,4'-bis(dimethylamino) benzophenone, 4,4'-bis-(diethylamino)benzophenone and 4,4'-bis(diphenylamino)benzophenone. Of these, 4,4'-bis (dimethylamino)benzophenone, 4,4'-bis(diethylamino) benzophenone and 4,4'-bis(diphenylamino)benzophenone are particularly preferred.

Examples of the N-substituted aminoaldehydes include N-substituted aminoaldehydes such as 4-N,N- dimethylamino-benzaldehyde, 4-N,N-diphenylaminobenzaldehyde and 4-N,N-divinylaminobenzaldehyde.

These modifying agents may be used either singly or in any combination thereof. The amount of the modifying agent used is suitably selected according to the properties required of the resulting diene rubber. However, it is generally within a range of from 1 to 50 equivalents, preferably from 1 to 20 equivalents, more preferably from 1 to 10 equivalents to the active organometallic compound.

The polar group-containing diene rubber (i-A-1) used in the present invention may be that obtained by allowing a combination of the modifying agent and a polyfunctional coupling agent to react with the active polymer. The reactions of the active polymer with the modifying agent and the polyfunctional coupling agent may be conducted at the same time or separately one after the other. The amount of the modifying agent used in such a case is as follows. The amount of the modifying agent used in the case where the modifying agent is allowed to react with the active polymer at the same time as the polyfunctional coupling agent or before the reaction with the polyfunctional coupling agent is generally within a range of from 0.1 to 0.9 equivalents, preferably from 0.2 to 0.8 equivalents, more preferably from 0.3 to 0.7 equivalents to the active organometallic compound. When the modifying agent is allowed to react with the active polymer after the reaction with the polyfunctional coupling agent, the amount of the modifying agent used is generally within a range of from 0.1 to 50 equivalents, preferably from 0.2 to 20 equivalents, more preferably from 0.3 to 10 equivalents to the active organometallic compound. On the other hand, the amount of the polyfunctional coupling agent used in such a case is as follows. The amount of the polyfunctional coupling agent used in the case where the polyfunctional coupling agent is allowed to react with the active polymer at the same time as the modifying agent or before the reaction with the modifying agent is generally within a range of from 0.1 to 0.9 equivalents, preferably from 0.2 to 0.8 equivalents, more preferably from 0.3 to 0.7 equivalents to the active organometallic compound. When the polyfunctional coupling agent is allowed to react with the active polymer after the reaction with the modifying agent, the amount of the polyfunctional coupling agent used is generally within a range of from 0.1 to 50 equivalents, preferably from 0.2 to 20 equivalents, more preferably from 0.3 to 10 equivalents to the active organometallic compound.

As examples of the polyfunctional coupling agent used, may be mentioned various kinds of polyfunctional coupling agents disclosed in, for example, Japanese Patent Application Laid-Open Nos. 143209/1981, 17362/1981, 55912/1982 and 162605/1983.

As specific examples of the polyfunctional coupling agent, may be mentioned tin type coupling agent such as tin dichloride, tin tetrachloride, tin tetrabromide, monomethyltin trichloride, monoethyltin trichloride, monobutyltin trichloride, monohexyltin trichloride, dimethyltin dichloride, diethyltin dichloride, dibutyltin dichloride, dibutyltin dibromide, tetramethoxytin, tetraethoxytin, tetrabutoxytin and bis(trichlorostannyl)ethane; silicon type coupling agents such as silicon dichloride, silicon dibromide, silicon tetrachloride, silicon tetrabromide, silicon tetraiodide, monomethyltrichlorosilane, monoethyltrichlorosilane, monombutyltrichlorosilane, monohexyltrichlorosilane, monomethyltribromosilane, dimethyldichlorosilane, diethyldichlorosilane, butyltrichlorosilane, dibutyldichlorosilane, dihexyldichlorosilane, dimethyldibromosilane, tetramethoxysilane, tetraethoxysilane, tetrabutoxysilane, diphenyldimethoxysilane, diphenyldimethoxysilane, diphenyldiethoxysilane, monochlorotrimethoxysilane, monobromotrimethoxysilane, dichlorodimethoxysilane, dibromodimethoxysilane, trichloromethoxysilane, tribromomethoxysilane, alkyltriphenoxysilanes and bis(trichlorosilyl)ethane; halogenated metal type coupling agents such as lead dichloride and germanium tetrachloride; unsaturated nitrile type coupling agents such as ethylacrylonitrile; halogenated hydrocarbon type coupling agents such as dichloromethane, dibromomethane, dichloroethane, dibromoethane, dichloropropane, dibromopropane, dibromobenzene, dichlorobenzene, chloroform, tribromomethane, trichloroethane, trichloropropane, tribromopropane, carbon tetrachloride and tetrachloroethane; ester type coupling agents such as methyl formate, ethyl formate, methyl acetate, ethyl acetate, propyl acetate, isopropyl acetate, amyl acetate, methyl propionate, methyl butyrate, ethyl butyrate, ethyl trimethylacetate, methyl caproate, ethyl caproate, methyl benzoate, ethyl benzoate, dimethyl adipate, diethyl adipate, ethyl benzoate, dimethyl terephthalate, diethyl terephthalate, dimethyl phthalate and dimethyl isophthalate; halide type coupling agents such as terephthalic acid dichloride, phthalic acid dichloride, isophthalic acid dichloride and adipic acid dichloride; and phosphorus type coupling agents such as tris(nonylphenyl) phosphite, trimethylphosphite and triethylphosphite. Of these, the tin type coupling agents, silicon type coupling agents, ester type coupling agents and halogenated hydrocarbon type coupling agents are preferred, with the tin type coupling agents and silicon type coupling agents being particularly preferred.

These polyfunctional coupling agents may be used either singly or in any combination thereof.

The modification reaction and coupling reaction may be conducted by bringing the diene polymer having the active metal into contact with the modifying agent and/or the polyfunctional coupling agent. In the case where the active polymer has been prepared by a polymerization reaction, the reaction can be generally performed by adding the prescribed amount of the modifying agent and/or the polyfunctional coupling agent to the reaction mixture containing the active polymer before termination of the polymerization. The reaction temperature and time may be widely selected. However, the reaction is generally conducted at room temperature to 120° C. for several seconds to several hours. In general, the modification rate is suitably selected within a range of from 10 to 100%. The modification rate can be determined by measuring respective absorption intensities by a differential refractometer (RI) in GPC and a spectrophotometer (UV) for ultraviolet and visible region to find a ratio (UV/RI) of the respective intensities and comparing the value with a calibration curve prepared in advance. The coupling rate may be suitably selected. However, it is generally within a range of from 10 to 100%. The coupling rate can be determined from an area ratio of high molecular weight to low molecular weight in a differential refractometer by GPC measurement.

No particular limitation is imposed on the active organometallic compound containing a polar group used in Preparation Process b, and that used as an initiator in usual anionic polymerization may be used. In general, an active organometallic amides is used. The active organometallic amide used may be either an amide prepared by allowing an active organometallic compound to react with a secondary amine in advance, or an amide formed in the polymerization reaction system by adding an active organometallic compound in the presence of at least a part of a monomer and a secondary amine like the process disclosed in Japanese Patent Application Laid-Open No. 199921/1994.

Examples of the secondary amine include aliphatic secondary amine compounds, aromatic secondary amine compounds and cyclic imine compounds. The aliphatic secondary amine compounds and cyclic imine compounds are preferred.

Examples of the aliphatic secondary amine compounds include dimethylamine, methylethylamine, methylpropylamine, methylbutylamine, methylamylamine, amylhexylamine, diethylamine, ethylpropylamine, ethylbutylamine, ethylhexylamine, dipropylamine, diisopropylamine, propylbutylamine, dibutylamine, diamylamine, dihexylamine, diheptylamine, dioctylamine, methylcyclopentylamine, ethylcyclopentylamine, methylcyclohexylamine, dicyclopentylamine and dicyclohexylamine. Of these, dimethylamine, methylethylamine, diethylamine, dipropylamine, diisopropylamine, dibutylamine, diamylamine, dihexylamine, diheptylamine and dioctylamine are preferred.

Examples of the aromatic secondary amine compounds include diphenylamine, N-methylaniline, N-ethylaniline, dibenzylamine, N-methylbenzylamine and N-ethylphenethylamine.

Examples of the cyclic imine compounds include aziridine, azetidine, pyrrolidine, piperidine, 2-methylpiperidine, 3-methylpiperidine, 4-methylpiperidine, 3,5-dimethylpiperidine, 2-ethylpiperidine, hexamethyleneimine, heptamethyleneimine, dodecamethyleneimine, coniine, morpholine, oxazine, pyrroline, pyrrole and azepine. Of these, pyrrolidine, piperidine, 3-methylpiperidine, 4-methylpiperidine, 3,5-dimethylpiperidine, 2-ethylpiperidine, hexamethyleneimine and heptamethyleneimine are preferred.

These secondary amines may be used either singly or in any combination thereof.

In the case where the active organometallic amide prepared by allowing an active organometallic compound to react with a secondary amine in advance is used, the amount of the active organometallic amide used is suitably selected according to the molecular weight required of a polymer formed. However, it is generally within a range of from 0.1 to 30 mmol, preferably from 0.2 to 15 mmol, more preferably from 0.3 to 10 mmol, per 100 g of the whole monomer used.

In the case where the active organometallic amide is formed in the polymerization reaction system by adding an active organometallic compound and a secondary amine to the system, the amount of the organometallic compound used is suitably selected according to the molecular weight required of a polymer formed. However, it is generally within a range of from 0.1 to 30 mmol, preferably from 0.2 to 15 mmol, more preferably from 0.3 to 10 mmol, per 100 g of the whole monomer used. The amount of the secondary amine used at this time is generally within a range of from 0.5 to 2 equivalents, preferably from 0.8 to 1.5 equivalent, more preferably from 1 to 1.2 equivalents to the active organometallic compound.

The polymerization reaction of Preparation Process b may be conducted in accordance with a process known per se in the art. For example, the reaction may be carried out by bringing the active organometallic compound into contact with the secondary amine compound in the presence of at least a part of the monomer(s) in accordance with the process disclosed in Japanese Patent Application Laid-Open No. 199921/1994. Other polymerization conditions are the same as those in Preparation Process a described above.

In the process of Preparation Process b, the polymer formed may be allowed to react with the modifying agent and/or the polyfunctional coupling agent after completion of the polymerization reaction. The amounts of the modifying agent and/or the polyfunctional coupling agent used and reaction conditions are the same as those specifically described in Preparation Process a.

No particular limitation is imposed on the vinyl bond (1,2-vinyl bond and 3,4-vinyl bond) content in conjugated diene bond units of the polar group-containing diene rubber (i-A-1) thus obtained by the process of Preparation Process a or b. However, the vinyl bond content is generally at least 10%, preferably within a range of from 10 to 90%, more preferably from 30 to 85%, most preferably from 50 to 80%. When the vinyl bond content in the conjugated diene bond units falls within this range, the resulting rubber composition is balanced between abrasion resistance and heat build-up resistance at a high level. Therefore, the vinyl bond content within such a range is preferred. The remaining conjugated diene bond unit other than the vinyl bond is a 1,4-bond. The 1,4-bond may be either a 1,4-cis bond or a 1,4-trans bond.

No particular limitation is imposed on Preparation Process c, or a process in which a conjugated diene and a polar group-containing vinyl monomer, or a conjugated diene, a polar group-containing vinyl monomer and another copolymerizable monomer are copolymerized. However, an emulsion polymerization process is generally adopted. In the emulsion polymerization process, may be adopted a usual emulsion polymerization technique. An example thereof includes a process in which the prescribed amount of at least one monomer is emulsified and dispersed in an aqueous medium in the presence of an emulsifying agent to emulsion polymerize it by a radical polymerization initiator.

Examples of the emulsifying agent used include salts of long chain fatty acids having at least 10 carbon atoms, and rosinates. Specific examples thereof include potassium salts and sodium salts of capric acid., lauric acid, myristic acid, palmitic acid, oleic acid and stearic acid.

Examples of the radical polymerization initiator used include persulfates such as ammonium persulfate and potassium persulfate; and redox initiators such as a combination of ammonium persulfate and ferric sulfate, a combination of an organic peroxide and ferric sulfate, and a combination of hydrogen peroxide and ferric sulfate.

In order to control the molecular weight of the resulting copolymer, a chain transfer agent may be added. Examples of the chain transfer agent used include mercaptans such as t-dodecylmercaptan, n-dodecylmercaptan, α-methylstyrene dimer, carbon tetrachloride, thioglycolic acid, diterpene, terpinolene and γ-terpinene.

The temperature of the emulsion polymerization is suitably selected according to the kind of the radical polymerization initiator used. However, the polymerization is generally conducted at 0 to 100° C., preferably 0 to 60° C. The polymerization style may be either continuous polymerization or batch polymerization.

As the conversion of the monomer(s) into the polymer becomes higher, the polymer formed tends to gel. Therefore, it is preferred that the conversion should be controlled to at most 90%. It is particularly preferred to terminate the polymerization at a conversion within a range of from 50 to 80%. The termination of the polymerization reaction is generally conducted by adding a terminator to the polymerization system at the time the prescribed conversion has been reached. Examples of the terminator used include amine compounds such as diethylhydroxylamine and hydroxylamine; quinone compounds such as hydroquinone and benzoquinone; and compounds such as sodium nitrite and sodium dithiocarbamate.

After the termination of the emulsion polymerization reaction, unreacted monomer(s) are removed from the resultant polymer latex as needed, and an acid such as nitric acid or sulfuric acid is then added and mixed as needed, thereby adjusting the pH of the latex to the desired value. Thereafter, a salt such as sodium chloride, calcium chloride or potassium chloride as a coagulant is added and mixed to coagulate the polymer as crumbs. The crumbs are washed, dehydrated and then dried by a band drier or the like, whereby the intended polar group-containing diene rubber can be obtained.

Examples of a further polar group-containing diene rubber (i-A-3) include natural rubber, emulsion-polymerized styrene-acrylonitrile-butadiene terpolymer rubber, acrylonitrile-butadiene copolymer rubber and chloroprene rubber. Of these, natural rubber is preferred.

No particular limitation is imposed on any other diene rubber (i-B) having no polar group. However, diene rubber generally used in the rubber industry may be used. Specific examples thereof include polyisoprene rubber (IR), emulsion-polymerized styrene-butadiene copolymer rubber (SBR), solution-polymerized random SBR (bound styrene: 5 to 50 wt. %; 1,2-bond content of butadiene bond unit portion: 10 to 80%), high-trans SBR (1,4-trans bond content of butadiene bond unit portion: 70 to 95%), low-cis polybutadiene rubber (BR), high-cis BR, high-trans BR (1,4-trans bond content of butadiene bond unit portion: 70 to 95%), styrene-isoprene copolymer rubber (SIR), butadiene-isoprene copolymer rubber, solution-polymerized random styrene-butadiene-isoprene terpolymer rubber (SIBR), emulsion-polymerized SIBR, high-vinyl SBR-low-vinyl SBR block copolymer rubber, and block copolymers such as polystyrene-polybutadiene-polystyrene block copolymers. The diene rubber may be suitably selected according to the properties required of the resulting rubber composition. Of these, BR, IR, SBR and SIBR are preferred.

No particular limitation is imposed on the Mooney viscosity ($ML_{1+4}$, 100° C.) of the diene rubber (i). However, it is generally within a range of from 10 to 200, preferably from 20 to 150, more preferably from 25 to 120. When the Mooney viscosity falls within this range, the resulting rubber composition is balanced between heat build-up resistance and processability at a high level. Therefore, the Mooney viscosity within such a range is preferred.

When the diene rubber (i) contains aromatic vinyl units, no particular limitation is imposed on the chain distribution of aromatic vinyl units. However, from the viewpoint of balancing among various properties such as heat build-up resistance, abrasion resistance and wet skid resistance at a high level, it is appropriate that the content of a simple chain of one aromatic vinyl unit should be generally at least 40 wt. %, preferably at least 60 wt. %, more preferably at least 75 wt. %, based on the whole bound aromatic vinyl content, and the content of aromatic vinyl long chains composed of at least 8 aromatic vinyl units should be generally at most 5 wt. %, preferably at most 2.5 wt. %, more preferably at most 1.5 wt. %, based on the whole bound aromatic vinyl content.

The diene rubber (i) useful in the practice of the present invention is at least one selected from among the polar group-containing diene rubbers (i-A) and other diene rubbers (i-B). These diene rubbers may be used either singly or in any combination thereof.

Polether-Based Polymer (ii)

No particular limitation is imposed on the polyether-based polymer (ii) used so far as it is a polymer having ether bonds (—C—O—C—) in its main chain. As the polyether-based polymer (ii), is preferably used a polymer obtained by addition-polymerizing one or more of oxirane compounds such as alkylene oxides, epihalohydrins and unsaturated epoxides in the form of a homopolymer, block copolymer or random copolymer.

Specific examples of the polyether-based polymer (ii) obtained by addition polymerizing one or more of the oxirane compounds include homopolymers of alkylene oxides, copolymers of at least two alkylene oxides, copolymers of an alkylene oxide and an epihalohydrin, copolymers of an alkylene oxide and an unsaturated epoxide, terpolymers of an alkylene oxide, an epihalohydrin and an unsaturated epoxide, homopolymers of epihalohydrins, copolymers of at least two epihalohydrins, copolymers of an epihalohydrin and an unsaturated epoxide, homopolymers of unsaturated epoxides, and copolymers of at least two unsaturated epoxides. Of these, the copolymers of at least two alkylene oxides and the copolymers of an alkylene oxide and an unsaturated epoxide are preferred, with the copolymers of an alkylene oxide and an unsaturated epoxide being particularly preferred.

Examples of the alkylene oxide include ethylene oxide, propylene oxide, 1,2-epoxybutane, 1,2-epoxy-isobutane, 2,3-epoxybutane, 1,2-epoxyhexane, 1,2-epoxyoctane, 1,2-epoxydecane, 1,2-epoxytetradecane, 1,2-epoxyhexadecane, 1,2-epoxyoctadecane, 1,2-epoxyeicosane, 1,2-epoxy-2-pentylpropane, 1,2-epoxy, 1,2-epoxycyclopentane, 1,2-epoxycyclohexane and 1,2-epoxycyclododecane. Of these, lower alkylene oxides such as ethylene oxide, propylene oxide, butylene oxide, isobutylene oxide and amylene oxide are preferred, with ethylene oxide and propylene oxide being particularly preferred.

Examples of the epihalohydrin include epichlorohydrin, epibromohydrin, epliodohydrin, 2,3-epoxy-1,1,1-trifluoropropane and 1,2-epoxy-1H,1H,2H,3H,3H-heptadecafluoroundecane. Epichlorohydrin is generally used.

No particular limitation is imposed on the unsaturated epoxide so far as it has at least one carbon-carbon unsaturated bond and at least one epoxy group in its molecule. However, examples thereof include alkenyl glycidyl ethers such as allyl glycidyl ether, butenyl glycidyl ether and octenyl glycidyl ether; alkenyl epoxides such as 3,4-epoxy-1-butene, 1,2-epoxy-5-hexene and 1,2-epoxy-9-decene; and aryl epoxides such as styrene epoxide and glycidyl phenyl ether. Of these, the alkenyl glycidyl ethers are preferred, with allyl glycidyl ether being particularly preferred.

As examples of other oxirane compounds, may be mentioned 1,2-epoxy-1-methoxy-2-methylpropane, 2-(3,4-epoxycyclohexyl)ethyltrimethoxysilane and 3-glycidyloxypropyltrimethoxysilane.

These oxirane compounds may be used either singly or in any combination thereof.

The kind(s) and content of the oxirane compound(s) in the polyether-based polymer (ii) are suitably selected as necessary for the end application intended. For example, in the case where the resulting rubber composition is balanced between heat build-up resistance and tensile strength at a high level, a polyether-based polymer (ii-A) obtained by copolymerizing an alkylene oxide and an unsaturated epoxide is generally used. In that case, the content of the alkylene oxide is generally within a range of from 85 to 99.9 wt. %, preferably from 90 to 99 wt. %, more preferably from 95 to 99 wt. %, while the content of the unsaturated epoxide is generally within a range of from 15 to 0.1 wt. %, preferably from 10 to 1 wt. %, more preferably from 5 to 1 wt. %. In order to highly improve the processability of the resulting rubber composition, a polyether-based polymer (ii-B) containing an alkylene oxide in a proportion of generally at least 50 wt. %, preferably at least 70 wt. %, more preferably at least 90 wt. % is preferably used. In the case where good antistatic property is required in addition to the objects (heat build-up resistance, tensile strength and processability) of the present invention, a polyether-based polymer (ii-C) containing, as an alkylene oxide, ethylene oxide in a proportion of at least 50 wt. %, preferably at least 60 wt. %, more preferably at least 70 wt. % is preferably used. From the viewpoint of balancing among all properties of build-up resistance, tensile strength, processability and antistatic property at a high level, the alkylene oxide component in the polyether-based polymer (ii-A) is preferably composed of ethylene oxide in a proportion of generally 50 to 100 wt. %, preferably 60 to 99 wt. %, more preferably 70 to 97 wt. % and propylene oxide in a proportion of generally 50 to 0 wt. %, preferably of 40 to 1 wt. %, more preferably 30 to 3 wt. %. A preferred copolymer is a copolymer composed of 50 to 99 wt. % of ethylene oxide, 0 to 49 wt. % of propylene oxide and 1 to 15 wt. % of allyl glycidyl ether.

Among the polyether-based polymers (ii), an ethylene oxide-propylene oxide-unsaturated epoxide terpolymer, ① the bound ethylene oxide content of which is 50 to 98.9 wt. %, preferably 60 to 97.5 wt. %, more preferably 70 to 96 wt. %, ② the bound propylene oxide content of which is 1 to 35 wt. %, preferably 2 to 30 wt. %, more preferably 3 to 25 wt. %, and ③ the bound unsaturated epoxide content of which is 0.1 to 15 wt. %, preferably 0.5 to 10 wt. %, more preferably 1 to 5 wt. %, is particularly preferred from the viewpoint of balancing among all properties of build-up resistance, tensile strength, processability and antistatic property at a high level. In this terpolymer, the unsaturated epoxide is preferably an alkenyl glycidyl ether such as allyl glycidyl ether.

The (co)polymers of the oxirane compound(s) including the above terpolymer can be generally obtained in accordance with a solution polymerization process or solvent-slurry polymerization process. Examples of a catalyst used include homogeneous catalysts such as a system with water and acetylacetone reacted with an organoaluminum compound (Japanese Patent Publication No. 15797/1960), a system with phosphoric acid and triethylamine reacted with triisobutylaluminum (Japanese Patent Publication No. 27534/1971) and a system with phosphoric acid and an organic acid salt of diazabicycloundecene reacted with triisobutylaluminum (Japanese Patent Publication No. 51171/1981); and heterogeneous catalysts such as a system composed of a partially hydrolyzed product of an aluminum alkoxide and an organozinc compound (Japanese Patent Publication No. 2945/1968), a system composed of an organozinc compound and a polyhydric alcohol (Japanese Patent Publication No. 7751/1970) and a system composed of dialkylzinc and water (Japanese Patent Publication No. 3394/1961). In the case where the solvent-slurry polymerization process is adopted, it is preferred from the viewpoint of stability of the polymerization reaction system to use a catalyst pretreated with both of a monomer capable of forming a polymer soluble in a solvent for polymerization and a monomer capable of forming a polymer insoluble in such a solvent.

Examples of the solvent used include aromatic hydrocarbons such as toluene; pentane such as n-pentane; hexane such as n-hexane; and alicyclic hydrocarbons such as cyclopentane.

In the case where a solvent such as n-pentane, n-hexane or cyclopentane is used to adopt the solvent-slurry polymerization process, from the viewpoint of stability of the polymerization reaction system as described above, it is preferred to pretreat the catalyst with, for example, ethylene oxide capable of forming a polymer insoluble in the solvent and propylene oxide capable of forming a polymer soluble in the solvent. The treatment of the catalyst may be conducted by mixing a catalyst component with small amounts of the respective monomers and aging the mixture at a temperature of 0 to 100° C., preferably 30 to 50° C.

The polymerization reaction can be conducted by charging the monomer component, catalyst component, solvent for polymerization, and the like into a reactor at a temperature of 0 to 100° C., preferably 30 to 70° C. by an optional process such as a batch process, semi-batch process or continuous process.

No particular limitation is imposed on the Mooney viscosity ($ML_{1+4}$, 100° C.) of the polyether-based polymer (ii). However, it is generally within a range of from 10 to 200, preferably from 20 to 150, more preferably from 25 to 120. When the Mooney viscosity falls within a range of from 70 to 150, preferably from 80 to 140, more preferably from 85 to 120, the resulting rubber composition is balanced among heat build-up resistance, tensile strength and processability at a high level. Therefore, the Mooney viscosity within such a range is preferred in the present invention.

These polyether-based polymers (ii) may be used either singly or in any combination thereof. The amount of the polyether-based polymer used is suitably selected as necessary for the end application intended. However, it is generally within a range of from 0.1 to 50 parts by weight, preferably from 1 to 30 parts by weight, more preferably from 3 to 15 parts by weight per 100 parts by weight of the diene rubber. If the amount of the polyether-based polymer used is too little, its improving effect on heat build-up resistance, tensile strength and processability becomes insufficient. If the amount is too great on the other hand, the heat build-up of the resulting rubber composition becomes insufficient. Therefore, such a little or great amount is not preferred.

Silica

No particular limitation is imposed on silica compounded. However, examples thereof include dry process white carbon, wet process white carbon, colloidal silica and precipitated silica disclosed in Japanese Patent Application Laid-Open No. 62838/1987. Of these, wet process white carbon comprising hydrous silicic acid as a main component is particularly preferred.

No particular limitation is imposed on the specific surface area of the silica. However, it is preferred that the specific surface area should be generally within a range of from 50 to 400 m²/g, preferably from 100 to 250 m²/g, more preferably from 120 to 190 m²/g in terms of a specific surface area determined by nitrogen absorption (BET method), because improvements of heat build-up resistance, tensile strength and processability are sufficiently achieved. The specific surface area determined by nitrogen absorption as used herein is a value determined by the BET method in accordance with ASTM D 3037-81.

These kinds of silica may be used either singly or in any combination thereof. The compounding proportion of the silica is suitably selected as necessary for the end application intended. However, the silica is generally used in a proportion of 10 to 200 parts by weight, preferably 20 to 150 parts by weight, more preferably 30 to 120 parts by weight, per 100 parts by weight of the diene rubber.

In the present invention, the silica may be used in combination with carbon black.

No particular limitation is imposed on the carbon black. However, examples thereof include furnace black, acetylene black, thermal black, channel black and graphite. Of these, furnace black is particularly preferred. Specific examples thereof include various grades of carbon black, such as SAF, ISAF, ISAF-HS, ISAF-LS, IISAF-HS, HAF, HAF-HS, HAF-LS and FEF. These kinds of carbon black may be used either singly or in any combination thereof.

No particular limitation is imposed on the specific surface area ($N_2SA$) of the carbon black determined by nitrogen absorption. However, it is generally within a range of from 5 to 200 $m^2/g$, preferably from 50 to 150 $m^2/g$, more preferably from 80 to 130 $m^2/g$. No particular limitation is also imposed on the DBP absorption of the carbon black. However, it is generally within a range of from 5 to 300 ml/100 g, preferably from 50 to 200 ml/100 g, more preferably from 80 to 160 ml/100 g.

When high structure carbon black disclosed in Japanese Patent Application Laid-Open No. 230290/1993, wherein the specific surface area determined by absorption of cetyltrimethylammonium bromide (CTAB) is 110 to 170 $m^2/g$, and the DBP oil absorption (24M4DBP) after compressed repeatedly 4 times under a pressure of 24,000 psi is 110 to 130 ml/100 g, is used, the abrasion resistance of the resulting rubber composition can be improved.

In the case where silica and carbon black are used in combination, the compounding proportions thereof are suitably selected as necessary for the end application intended. However, they are generally used at the weight ratio of silica to carbon black of 10:90 to 99:1, preferably 30:70 to 95:5, more preferably 50:50 to 90:10.

Silane Coupling Agent

In the present invention, it is preferred to add a silane coupling agent to the rubber composition, because the heat build-up resistance thereof is further improved.

No particular limitation is imposed on the silane coupling agent. However, examples thereof include vinyltrichlorosilane, vinyltriethoxysilane, vinyltris(β-methoxyethoxy)silane, β-(3,4-epoxycyclohexyl)ethyltrimethoxysilane, γ-glycidoxypropyltrimethoxysilane, γ-methacryloxypropyltrimethoxysilane, N-(β-aminoethyl)-γ-aminopropyltrimethoxysilane, N-(β-aminoethyl)-γ-aminopropylmethyldimethoxysilane, N-phenyl-γ-aminopropyltrimethoxysilane, γ-chloropropyltrimethoxysilane, γ-mercaptopropyltrimethoxysilane, γ-aminopropyltriethoxysilane, bis(3-(triethoxysilyl)propyl) tetrasulfide, and tetrasulfides described in Japanese Patent Application Laid-Open No. 248116/1994, such as γ-trimethoxysilylpropyldimethylthiocarbamyl tetrasulfide and γ-trimethoxysilylpropylbenzothiazyl tetrasulfide.

These silane coupling agents may be used either singly or in any combination thereof. The compounding proportion of the silane coupling agent is generally within a range of from 0.1 to 30 parts by weight, preferably from 1 to 20 parts by weight, more preferably from 2 to 10 parts by weight, per 100 parts by weight of the silica.

Rubber Composition

In addition to the above-described components, the rubber compositions according to the present invention may contain necessary amounts of other compounding agents such as vulcanizing agents, vulcanization accelerators, vulcanization activators, antioxidants, activators, plasticizers, lubricants and fillers in accordance with a method known per se in the art.

No particular limitation is imposed on the vulcanizing agents. However, examples thereof include various kinds of sulfur, such as sulfur powder, precipitated sulfur, colloidal sulfur, insoluble sulfur and high-dispersible sulfur; sulfur halides such as sulfur monochloride and sulfur dichloride; organic peroxides such as dicumyl peroxide and di-tert-butyl peroxide; quinone dioximes such as p-quinone dioxime and p,p'-dibenzoylquinone dioxime; organic polyamine compounds such as triethylenetetramine, hexamethylenediamine carbamate and 4,4'-methylenebis-o-chloroaniline; and alkylphenol resins having a methylol group. Of these, sulfur is preferred, with sulfur powder being particularly preferred. These vulcanizing agents may be used either singly or in any combination thereof.

The compounding proportion of the vulcanizing agent is generally within a range of from 0.1 to 15 parts by weight, preferably from 0.3 to 10 parts by weight, more preferably from 0.5 to 5 parts by weight, per 100 parts by weight of the diene rubber. The compounding proportion of the vulcanizing agent within this range is particularly preferred because the resulting rubber composition becomes excellent in tensile strength and also in properties such as heat build-up resistance and residual strain.

Examples of the vulcanization accelerators include sulfenamide type vulcanization accelerators such as N-cyclohexyl-2-benzothiazole sulfenamide, N-t-butyl-2-benzothiazole sulfenamide, N-oxyethylene-2-benzothiazole sulfenamide, N-oxyethylene-2-benzothiazole sulfenamide and N,N'-diisopropyl-2-benzothiazole sulfenamide; guanidine type vulcanization accelerators such as diphenylguanidine, di-o-tolylguanidine and o-tolylbiguanidine; thiourea type vulcanization accelerators such as thiocarboanilide, di-o-tolylthiourea, ethylenethiourea, diethylenethiourea and trimethylthiourea; thiazole type vulcanization accelerators such as 2-mercaptobenzothiazole, dibenzothiazyl disulfide, 2-mercaptobenzothiazole zinc salt, 2-mercaptobenzothiazole sodium salt, 2-mercaptobenzothiazole cyclohexylamine salt and 2-(2,4-dinitrophenylthio)benzothiazole; thiuram type vulcanization accelerators such as tetramethylthiuram monosulfide, tetramethylthiuram disulfide, tetraethylthiuram disulfide, tetrabutylthiuram disulfide and dipentamethylenethiuram tetrasulfide; dithiocarbamic acid type vulcanization accelerators such as sodium dimethyldithiocarbamate, sodium diethyldithiocarbamate, sodium di-n-butyldithiocarbamate, lead dimethyldithiocarbamate, zinc dimethyldithiocarbamate, zinc diethyldithiocarbamate, zinc di-n-butyldithiocarbamate, zinc pentamethylene dithiocarbamate, zinc ethylphenyldithiocarbamate, tellurium diethyldithiocarbamate, selenium dimethyldithiocarbamate, selenium diethyldithiocarbamate, copper dimethyldithiocarbamate, iron dimethyldithiocarbamate, diethylamine diethyldithiocarbamate, piperidine pentamethylene dithiocarbamate and pipecoline pentamethylene dithiocarbamate; and xanthogenic acid type vulcanization accelerators such as sodium isopropylxanthogenate, zinc isopropylxanthogenate and zinc butylxanthogenate.

These vulcanization accelerators may be used either singly or in any combination thereof. However, it is particularly preferred that the vulcanization accelerator comprises a sulfenamide type vulcanization accelerator. The compounding proportion of the vulcanization accelerator is generally within a range of from 0.1 to 15 parts by weight, preferably from 0.3 to 10 parts by weight, more preferably from 0.5 to 5 parts by weight, per 100 parts by weight of the diene rubber.

No particular limitation is imposed on the vulcanization activators. However, for example, higher fatty acids such as stearic acid, zinc oxide, and the like may be used. As the zinc oxide, zinc oxide of high surface activity having a particle size of at most 5 μm is preferably used. As specific examples of such zinc oxide, may be mentioned active zinc white having a particle size of 0.05 to 0.2 μm and zinc white having a particle size of 0.3 to 1 μm. The zinc oxide may be surface-treated with an amine type dispersing agent or wetting agent before use.

These vulcanization activators may be used either singly or in any combination thereof. The compounding proportion of the vulcanization activator is suitably selected according to the kind of the vulcanization activator used. In the case where a higher fatty acid is used, it is generally within a range of from 0.05 to 15 parts by weight, preferably from 0.1 to 10 parts by weight, more preferably from 0.5 to 5 parts by weight, per 100 parts by weight of the diene rubber. In the case where zinc oxide is used, it is generally within a range of from 0.05 to 10 parts by weight, preferably from 0.1 to 5 parts by weight, more preferably from 0.5 to 2 parts by weight, per 100 parts by weight of the diene rubber. When the compounding proportion of the zinc oxide falls within this range, a rubber composition well balanced between the properties of tensile strength and processability is provided. Therefore, the compounding proportion within such a range is preferred.

Examples of other compounding agents include coupling agents other than the silane coupling agents; activators such as diethylene glycol, polyethylene glycol and silicone oil; fillers such as calcium carbonate, talc and clay; and process oil and waxes.

The rubber compositions according to the present invention can be obtained by kneading the individual components in a method known per se in the art. For example, the compounding agents except for the vulcanizing agent and vulcanization accelerator, and the diene rubber are mixed, and the vulcanizing agent and vulcanization accelerator are then mixed with the resultant mixture, whereby a rubber composition can be obtained. The temperature at which the compounding agents except for the vulcanizing agent and vulcanization accelerator, and the diene rubber are mixed is generally 80 to 200° C., preferably 100 to 190° C., more preferably 140 to 180° C. The mixing is generally conducted for at least 30 seconds, preferably 1 to 30 minutes. The vulcanizing agent and vulcanization accelerator are mixed after cooling down to generally 100° C. or lower, preferably room temperature to 80° C. Thereafter, the mixture is press-vulcanized at a temperature of generally 120 to 200° C., preferably 140 to 180° C.

EXAMPLES

The present invention will hereinafter be described more specifically by the following Preparation Examples, Examples and Comparative Examples. All designations of "part" or "parts" and "%" as will be used in these examples mean part or parts by weight and wt. % unless expressly noted.

Various physical properties were determined in accordance with the following respective methods:

(1) The bound styrene content in each polymer was determined in accordance with JIS K 6383 (refractive index method).
(2) The vinyl bond content in the butadiene bond units in each polymer was determined in accordance with an infrared spectroscopy (Hampton method).
(3) The Mooney viscosity ($ML_{1+4}$, 100° C.) of each polymer was measured in accordance with JIS K 6301.
(4) The tensile strength of each test sample was determined by measuring its stress ($Kgf/cm^2$) at 300% elongation in accordance with JIS K 6301. This property was expressed in terms of an index (tensile strength index). The higher index indicates better tensile strength.
(5) The heat build-up resistance of each test sample was determined by measuring tan δ at 0° C. and 60° C. at 1% torsion and 20 Hz by means of an RDA-II manufactured by Rheometrics Co. This property was expressed in terms of an index (heat build-up index) assuming that the value of (tan δ at 0° C./tan δ at 60° C.) in Comparative Example is 100. The higher index indicates better heat build-up resistance.
(6) The processability of each rubber composition was determined by evaluating the composition as to winding tendency of the composition on a roll and dispersibility of silica in accordance with the following respective standards, and ranking it among the following three ranks according to the total score thereof:

○: 7 or 8 points;

Δ: 5 or 6 points;

X: 2 to 4 points.

① Winding tendency on a roll:

Score 4: Wound closely:

Score 3: Wound, but slightly rose to the surface of the roll;

Score 2: Wound, but frequently rose to the surface of the roll;

Score 1: Scarcely wound.

② Dispersibility of silica (evaluated by an SEM photograph of the surface of a sample):

Score 4: Evenly dispersed;

Score 3: Evenly dispersed though a small difference arose between particle diameters;

Score 2: A great difference arose between particle diameters;

Score 1: Scarcely dispersed.

(7) The antistatic property of each rubber composition was determined by measuring discharge voltage on the surface of a sample after discharging at 10 kV by means of a Neostometer (measuring conditions: 23° C.±1° C., relative humidity 50±5%, sample 40×40×2 mm, distance between electrodes 20 mm), and evaluated in accordance with the following standard:

○: Scarcely detectable;

Δ: Lower than +0.5 kV;

X: Not lower than +0.5 kV.

Preparation Examples 1

(Preparation of Diene Rubber Nos. 1 to 12)

Diene Rubber Nos. 1 and 2 were prepared by copolymerizing a polar group-containing monomer such as N,N-dimethylaminopropyl acrylamide (DAP) or 2-vinylpyridine (2VP) in accordance with the emulsion polymerization process disclosed in Japanese Patent Application Laid-Open No. 101344/1989. The properties of Diene Rubber Nos. 1 and 2 are shown in Table 1.

Diene Rubber Nos. 3 to 12 were prepared by (co) polymerizing butadiene, or butadiene and styrene using n-butyllithium as an initiator in accordance with the anionic polymerization process disclosed in Japanese Patent Publication No. 18933/1994 and then allowing a polar group-containing modifying agent, or the modifying agent and a polyfunctional coupling agent to react. The properties of Diene Rubber Nos. 3 to 12 are shown in Table 1.

TABLE 1

| Diene Rubber No. | 1 | 2 | 3 | 4 | 5 | 6 | 7 | 8 | 9 | 10 | 11 | 12 |
|---|---|---|---|---|---|---|---|---|---|---|---|---|
| Prep. process (*1) | A | A | B | B | B | B | B | B | B | B | B | B |
| Modifier (*2) | — | — | DAP | EAB | EAB | AST | EO | EO | NMC | NMP | NPP | NPP |
| Modifying rate (*3) | — | — | 0.5 | 0.3 | 0.7 | 0.5 | 0.4 | 0.6 | 0.5 | 0.5 | 1.0 | 1.0 |
| Coupling agent (*4) | — | — | TMSi | TCSn | TCSn | TCSn | TMSi | TMSi | TMSi | TCSn | — | — |
| Coupling rate (*5) | — | — | 0.5 | 0.7 | 0.3 | 0.5 | 0.6 | 0.4 | 0.5 | 0.5 | — | — |
| Polymer composition (wt. %) | | | | | | | | | | | | |
| Butadiene content | 79.5 | 79.5 | 87 | 79 | 77 | 85 | 95 | 87 | 79 | 70 | 55 | 100 |
| Styrene content | 20 | 20 | 13 | 21 | 23 | 15 | 5 | 13 | 21 | 30 | 45 | — |
| DAP (*6) content | 0.5 | — | — | — | — | — | — | — | — | — | — | — |
| 2VP (*7) content | — | 0.5 | — | — | — | — | — | — | — | — | — | — |
| Polymer properties | | | | | | | | | | | | |
| 1,2-Vinyl content (%) | 18 | 18 | 70 | 63 | 40 | 30 | 75 | 72 | 65 | 50 | 25 | 80 |
| $ML_{1+4}$, 100° C. | 60 | 60 | 50 | 50 | 50 | 50 | 80 | 80 | 80 | 80 | 80 | 50 |

Note:
(*1) A: emulsion polymerization, B: anionic polymerization
(*2) Modifying agent:
DAP: N,N-dimethylaminopropyl acrylamide,
EAB: 4,4'-bis(dimethylamino)benzophenone,
AST: N,N-dimethylaminostyrene,
EO: ethylene oxide
NMC: N-methyl-ε-caprolactam,
NMP: N-methylpyrrolidone,
NPP: N-phenylpyrrolidone.
(*3) Modifying agent/n-butyllithium (equivalent ratio)
(*4) Coupling agent:
TMSi: tetramethoxysilane,
TCSn: tin tetrachloride.
(*5) Coupling agent/n-butyllithium (equivalent ratio)
(*6) DAP: N,N-dimethylaminopropyl acrylamide
(*7) 2VP: 2-vinylpyridine.

Preparation Example 2
(Preparation of Polyether-Based Polymer Nos. 1 to 6)

Polyether-based Polymer No. 1, and Polyether-based Polymer Nos. 2 and 3 were prepared in accordance with the processes described in Japanese Patent Publication No. 15797/1960 and Japanese Patent Publication No. 51171/1981, respectively. Polyether-based Polymer Nos. 4 to 6 were prepared in accordance with the slurry polymerization process described in Japanese Patent Application Laid-Open No. 58488/1986. More specifically, these polymers were prepared in the following manner.

<Polyether-Based Polymer No. 1>
(Preparation of Catalyst Solution)

A pressure glass bottle having an internal volume of 800 ml, on which a stopper had been put, was purged with nitrogen and charged with 180 g of toluene and 60 g of triisobutylaluminum. After the glass bottle was immersed in ice water to cool it, 109.1 g of tetrahydrofuran were added, and the mixture was stirred. While cooling the mixture with ice water, 2.72 g of distilled water were then added, and the mixture was stirred. At this time, the pressure within the bottle was raised by the reaction of the organoaluminum compound with water. Therefore, the pressure was reduced at proper time. While cooling the reaction mixture with ice water, 15.1 g of acetylacetone were then added, and the mixture was stirred. The reaction mixture thus obtained was aged for 20 hours in a hot water bath of 30° C. to obtain a catalyst solution.

(Preparation of Polymer)

An autoclave having an internal volume of 5 liters and equipped with a stirrer was purged with nitrogen, and charged with 2,250 g of toluene, 180 g of ethylene oxide and 70 g of propylene oxide. The internal temperature of the autoclave was set to 50° C., and 5 ml of the catalyst solution were added to initiate a reaction. Every 30 minutes, 5 ml of the catalyst solution were further added to allow the reaction to proceed. After adding the catalyst solution 10 times in total, the reaction was conducted further for 2 hours. The rate of polymerization reaction was 85%. To a polymer solution taken out, were added 42.5 g of a 5% toluene solution of 4,4'-thiobis(6-tert-butyl-cresol), and the mixture was stirred. The mixture containing the polymer solution was poured into a large amount of hexane to precipitate a polymer. The polymer was separated from the solvent and vacuum-dried overnight at 60° C.

(Analysis of Polymer)

The composition of the polymer was determined by $^1$H-NMR analysis. The compositions of all polyether-based polymers, which will be described subsequently, were determined likewise by $^1$H-NMR analysis.

<Polyether-Based Polymer No. 2>
(Preparation of Catalyst Solution)

A pressure glass bottle having an internal volume of 800 ml, on which a stopper had been put, was purged with nitrogen and charged with 180 g of toluene and 60 g of triisobutylaluminum. After the glass bottle was immersed in ice water to cool it, 224.2 g of diethyl ether were added, and the mixture was stirred. While cooling the mixture with ice water, 8.89 g of orthophosphoric acid were then added, and the mixture was stirred. At this time, the pressure within the bottle was raised by the reaction of the organoaluminum compound with orthophosphoric acid. Therefore, the pressure was reduced at proper time. To the reaction mixture, were then added 8.98 g of 1,8-diazabicyclo[5,4,0]undecene-7 formate. The reaction mixture thus obtained was aged for 1 hour in a hot water bath of 30° C. to obtain a catalyst solution.

(Preparation of Polymer)

An autoclave having an internal volume of 5 liters and equipped with a stirrer was purged with nitrogen, and charged with 2,250 g of toluene, 225 g of ethylene oxide and 25 g of allyl glycidyl ether. The internal temperature of the autoclave was set to 50° C., and 4 ml of the catalyst solution were added to initiate a reaction. Every 30 minutes, 4 ml of the catalyst solution were further added to allow the reaction to proceed. After adding the catalyst solution 10 times in total, the reaction was conducted further for 2 hours. The rate of polymerization reaction was 92%. To a polymer solution taken out, were added 46 g of a 5% toluene solution of 4,4'-thiobis(6-tert-butyl-cresol), and the mixture was stirred. The mixture containing the polymer solution was poured into a large amount of hexane to precipitate a polymer. The polymer was separated from the solvent and vacuum-dried overnight at 60° C.

<Polyether-Based Polymer No. 3>
(Preparation of Polymer)

An autoclave having an internal volume of 5 liters and equipped with a stirrer was purged with nitrogen, and charged with 2,250 g of toluene, 235 g of propylene oxide and 15 g of allyl glycidyl ether. The internal temperature of the autoclave was set to 50° C., and 3 ml of the same catalyst solution as that used in Polyether-based Polymer No. 2 were added to initiate a reaction. Every 30 minutes, 3 ml of the catalyst solution were further added to allow the reaction to proceed. After adding the catalyst solution 10 times in total, the reaction was conducted further for 2 hours. The rate of polymerization reaction was 94%. To a polymer solution taken out, were added 47 g of a 5% toluene solution of 4,4'-thiobis(6-tert-butyl-cresol), and the mixture was stirred. Steam was blown against the mixture containing the polymer solution to remove the solvent and unreacted monomers by steam stripping. The thus-obtained polymer was vacuum-dried overnight at 60° C.

<Polyether-Based Polymer No. 4>
(Preparation of Catalyst Solution)

An autoclave having an internal volume of 3 liters and equipped with a stirrer was purged with nitrogen and charged with 158.7 g of trisobutylaluminum, 1,170 g of toluene and 296.4 g of diethyl ether. The internal temperature of the autoclave was set to 30° C., and 23.5 g of orthophosphoric acid were gradually added with stirring. To the reaction mixture, were further added 12.1 g of triethylamine. The reaction mixture thus obtained was aged for 2 hours at 60° C. to obtain a catalyst solution.

(Preparation of Polymer)

An autoclave having an internal volume of 5 liters and equipped with a stirrer was purged with nitrogen, and charged with 2,100 g of n-hexane and 63 g of the catalyst solution. The internal temperature of the autoclave was set to 30° C., and 5% of a mixed solution composed of 264 g of ethylene oxide, 30 g of propylene oxide, 6 g of allyl glycidyl ether and 300 g of n-hexane was added with stirring. After conducting a reaction for 1 hour, the internal temperature was set to 60° C., and the remaining 95% of the mixed solution was continuously added over 5 hours. After completion of the addition, the reaction was conduction further for 2 hours. The rate of polymerization reaction was 90%. The interior of the autoclave was observed. As a result, it was found that almost all the polymer attached to the wall surface of the autoclave and stirring blades. The polymer attached to the wall surface and stirring blades was collected. The solvent was separated from the polymer thus obtained through a wire screen, and the residual polymer was vacuum-dried overnight at 60° C.

<Polyether-Based Polymer No. 5>
(Preparation of Catalyst Solution)

An autoclave having an internal volume of 5 liters and equipped with a stirrer was purged with nitrogen and charged with 2,100 g of n-hexane and 63 g of the same catalyst solution as that used in Polyether-based Polymer No. 4. The internal temperature of the autoclave was set to 30° C., and a mixed solution composed of 2 g of ethylene oxide, 4 g of propylene oxide and 6 g of n-hexane was added with stirring. The reaction mixture was aged for 1 hour.

(Preparation of Polymer)

The internal temperature of the autoclave containing the catalyst solution after the above-described treatment was set to 60° C., and a mixed solution composed of 260 g of ethylene oxide, 25 g of propylene oxide, 15 g of allyl glycidyl ether and 300 g of n-hexane was continuously added over 5 hours. After completion of the addition, the reaction was conduction further for 2 hours. The rate of polymerization reaction was 96%. The thus-obtained polymer was in the form of evener slurry compared with Polyether-based Polymer No. 4, and so the inner wall surface of the autoclave and stirring blades were very clean. To the slurry thus obtained, were added 57.6 g of a 5% toluene solution of 4,4'-thiobis(6-tert-butyl-cresol), and the mixture was stirred. After the solvent was separated from the slurry through a wire screen, the residual powdery polymer was vacuum-dried overnight at 40° C. to obtain a polymer sample in the form of clear powder.

<Polyether-Based Polymer No. 6>
(Preparation of Catalyst Solution)

An autoclave having an internal volume of 5 liters and equipped with a stirrer was purged with nitrogen and charged with 2,100 g of n-hexane and 63 g of the same catalyst solution as that used in Polyether-based Polymer No. 4. The internal temperature of the autoclave was set to 30° C., and a mixed solution composed of 2 g of ethylene oxide, 4 g of propylene oxide and 6 g of n-hexane was added with stirring. The reaction mixture was aged for 1 hour.

(Preparation of Polymer)

The internal temperature of the autoclave containing the catalyst solution after the above-described treatment was set to 60° C., and a mixed solution composed of 260 g of ethylene oxide, 20 g of propylene oxide, 20 g of allyl glycidyl ether and 300 g of n-hexane was continuously added over 5 hours. After completion of the addition, the reaction was conduction further for 2 hours. The rate of polymerization reaction was 95%. The thus-obtained polymer was in the form of evener slurry compared with Polyether-based Polymer No. 4, and so the inner wall surface of the autoclave and stirring blades were very clean. To the slurry thus obtained, were added 57 g of a 5% toluene solution of 4,4'-thiobis(6-tert-butyl-cresol), and the mixture was stirred. After the solvent was separated from the slurry through a wire screen, the residual powdery polymer was vacuum-dried overnight at 40° C. to obtain a polymer sample in the form of clear powder.

These results are shown in Table 2.

TABLE 2

| Polyether-based Polymer No. | 1 | 2 | 3 | 4 | 5 | 6 |
|---|---|---|---|---|---|---|
| Polymer composition (wt. %) | | | | | | |
| EO (*1) content | 70 | 97 | — | 90 | 90 | 90 |
| PO (*2) content | 30 | — | 97 | 9 | 7 | 5 |
| AGE (*3) content | — | 3 | 3 | 1 | 3 | 5 |
| Polymer properties | | | | | | |
| $ML_{1+4}$, 100° C. | 70 | 70 | 70 | 90 | 93 | 95 |

Note:
(*1) EO: ethylene oxide
(*2) PO: propylene oxide
(*3) AGE: allyl glycidyl ether.

Examples 1 to 9, Comparative Examples 1 and 2

A commercially available diene rubber shown in Table 4, or any of Diene Rubber Nos. 1 to 6 prepared in Preparation Example 1, as raw rubber, and Polyether-based Polymer No.

5 prepared in Preparation Example 2 were used. On the basis of the formulation shown in Table 3, the whole amount of the raw rubber, a half amount of silica and a half amount of a silane coupling agent were mixed with one another at 170° C. for 2 minutes in a 250-ml Brabender mixer, and the remaining compounding agents except for sulfur and a vulcanization accelerator were then added to knead the mixture for 2 minuets at the same temperature.

After each of the mixtures thus obtained, sulfur and the vulcanization accelerator were then added to an open roll controlled at 50° C. to knead them, the kneaded mixture was press-vulcanized at 160° C. for 30 minutes to produce test pieces, thereby determining their various physical properties. The results are shown in Table 4.

TABLE 3

| Formulation 1 | First | Second | Third |
|---|---|---|---|
| Raw rubber | Whole | — | — |
| Silica | Half | Half | — |
| Silane coupling agent (*1) | 2.5 | 2.5 | — |
| Polyether-based polymer | — | Whole | — |
| Stearic acid | — | 1.8 | — |
| Zinc oxide | — | 1.3 | — |
| Oil (*2) | — | 15 | — |
| Wax | — | 5 | — |
| Antioxidant (*3) | — | 2 | — |
| Sulfur | — | — | 1.4 |
| Vulcanization accelerator (*4) | — | — | 2.5 |

Note:
(*1) Si69 (product of Degussa AG)
(*2) Sansen 410 (product of Nippon Oil Co., Ltd.)
(*3) Nocrac 6C (product of Ouchi-Shinko Chemical Industrial Co., Ltd.)
(*4) Nocceler CZ (product of Ouchi-Shinko Chemical Industrial Co., Ltd.)

property as well. It is also understood that even when the amount of the polyether-based polymer compounded is 1 part by weight per 100 parts by weight of the diene rubber, its improving effect is developed (Example 1), that when the polar group-containing diene rubber is used as the diene rubber, the resultant rubber compositions are balanced among the properties of tensile strength, heat build-up resistance and processability at a higher level (Examples 4 to 9), and that when silica having a smaller specific surface area is compounded, the resultant rubber compositions are balanced among the tensile strength, heat build-up resistance and processability at a still higher level (Examples 2 to 8). On the other hand, the rubber compositions (Comparative Examples 1 and 2) comprising the diene rubber and silica and containing no polyether-based polymer are poor in processability and insufficient in tensile.strength and heat build-up resistance, and involve a problem that they are charged.

Examples 10 to 14, Comparative Example 3

A commercially available diene rubber shown in Table 6, and any of Diene Rubber Nos. 7 to 11 prepared in Preparation Example 1, as raw rubber, and Polyether-based Polymer No. 5 prepared in Preparation Example 2 were used. On the basis of the formulation shown in Table 5, the whole amount of the raw rubber, a half amount of silica and a half amount of a silane coupling agent were mixed with one another at 170° C. for 2 minutes in a 250-ml Brabender mixer, and the remaining compounding agents except for sulfur and a vulcanization accelerator were then added to knead the mixture for 3 minuets at the same temperature.

After each of the mixtures thus obtained, sulfur and the vulcanization accelerator were then added to an open roll

TABLE 4

| | Example | | | | | | | | | Comp. Ex. | |
|---|---|---|---|---|---|---|---|---|---|---|---|
| | 1 | 2 | 3 | 4 | 5 | 6 | 7 | 8 | 9 | 1 | 2 |
| Raw rubber (parts) | | | | | | | | | | | |
| SBR1502 (*1) | 100 | 100 | 100 | — | — | — | — | — | — | — | 100 |
| Diene Rubber No. 1 | — | — | — | 100 | — | — | — | — | — | — | — |
| Diene Rubber No. 2 | — | — | — | — | 100 | — | — | — | — | — | — |
| Diene Rubber No. 3 | — | — | — | — | — | 100 | — | — | — | — | — |
| Diene Rubber No. 4 | — | — | — | — | — | — | 100 | — | — | — | — |
| Diene Rubber No. 5 | — | — | — | — | — | — | — | 100 | — | — | — |
| Diene Rubber No. 6 | — | — | — | — | — | — | — | — | 100 | 100 | — |
| Compounding component (parts) | | | | | | | | | | | |
| Polyether-based Polymer No. 5 | 1 | 5 | 10 | 5 | 5 | 5 | 5 | 10 | 10 | — | — |
| Silica (*2) | — | 65 | 65 | 65 | 65 | 65 | 65 | 65 | — | — | — |
| Silica (*3) | 65 | — | — | — | — | — | — | — | 65 | 65 | 65 |
| Tensile strength index (*4) | 108 | 122 | 115 | 138 | 142 | 133 | 145 | 164 | 125 | 114 | 100 |
| Heat build-up index (*4) | 108 | 128 | 113 | 167 | 167 | 215 | 288 | 664 | 115 | 105 | 100 |
| Antistatic property | Δ | ○ | ○ | ○ | ○ | ○ | ○ | ○ | ○ | x | x |
| Processability | Δ | ○ | ○ | ○ | ○ | ○ | ○ | ○ | ○ | x | x |

Note:
(*1) Styrene-butadiene copolymer rubber [styrene content: 23.5%, Mooney viscosity ($ML_{1+4}$, 100° C.) = 50; product of Nippon Zeon Co., Ltd.]
(*2) Z1165MP (specific surface area determined by nitrogen absorption = 175 $m^2/g$; product of Rhone-Poulenc S.A.)
(*3) Nipsil AQ (specific surface area determined by nitrogen absorption = 200 $m^2/g$; product of Nippon Silica Industrial Co., Ltd.)
(*4) Expressed in terms of an index assuming that the value of Comparative Example 2 is 100.

As apparent from the results shown in Table 4, it is understood that the rubber compositions (Examples 1 to 9) according to the present invention are excellent in all properties of tensile strength, heat build-up resistance and processability and are excellent to the full in antistatic controlled at 50° C. to knead them, the kneaded mixture was press-vulcanized at 160° C. for 30 minutes to produce test pieces, thereby determining their various physical properties. The results are shown in Table 6.

TABLE 5

| Formulation 2 | First | Second | Third |
|---|---|---|---|
| Raw rubber | Whole | — | — |
| Silica (*1) | 20 | 20 | — |
| Silane coupling agent (*2) | 2 | 2 | — |
| Polyether-based polymer | — | Varied | — |
| Stearic acid | — | 2.5 | — |
| Zinc oxide | — | 1.5 | — |
| Aromatic oil (*3) | — | 10 | — |
| Wax | — | 2 | — |
| Antioxidant (*4) | — | 2 | — |
| Sulfur | — | — | 1.2 |
| Vulcanization accelerator (*5) | — | — | 0.1 |
| Vulcanization accelerator (*6) | — | — | 2 |

Note:
(*1) Ultrasil VN3 (specific surface area measured by nitrogen absorption = 175 m$^2$/g; product of Degussa AG)
(*2) Si69
(*3) Fucoal M (product of Fujikosan Co., Ltd.)
(*4) Nocrac 6C
(*5) Nocceler D (product of Ouchi-Shinko Chemical Industrial Co., Ltd.)
(*6) Nocceler CZ

TABLE 6

| | Example | | | | | Comp. Ex. |
|---|---|---|---|---|---|---|
| | 10 | 11 | 12 | 13 | 14 | 3 |
| Raw rubber (parts) | | | | | | |
| Diene Rubber No. 7 | 70 | — | — | — | — | 70 |
| Diene Rubber No. 8 | — | 70 | — | — | — | — |
| Diene Rubber No. 9 | — | — | 60 | — | — | — |
| Diene Rubber No. 10 | — | — | — | 60 | — | — |
| Diene Rubber No. 11 | — | — | — | — | 60 | — |
| IR2200 (*1) | 30 | 30 | 40 | 40 | 40 | 30 |
| Polyether-based polymer (parts) | | | | | | |
| Polyether-based Polymer No. 5 | 5 | 5 | 5 | 5 | 5 | — |
| Tensile strength index (*2) | 105 | 125 | 135 | 141 | 148 | 100 |
| Heat build-up index (*2) | 108 | 120 | 135 | 146 | 159 | 100 |
| Antistatic property | ○ | ○ | ○ | ○ | ○ | x |
| Processability | ○ | ○ | ○ | ○ | ○ | Δ |

Note:
(*1) Polyisoprene rubber [Mooney viscosity (ML$_{1+4}$, 100° C.) = 100; product of Nippon Zeon Co., Ltd.]
(*2) Expressed in terms of an index assuming that the value of Comparative Example 3 is 100.

As apparent from the results shown in Table 6, it is understood that even when any of various styrene-butadiene copolymer rubbers, which are different in styrene content and vinyl bond content in the butadiene bond portions, is used, the rubber compositions (Examples 10 to 14) according to the present invention are excellent to the full in all properties of tensile strength, heat build-up resistance and processability and are excellent to the full in antistatic property as well. It is also understood that when the styrene content in the styrene-butadiene copolymer rubber falls within a range of from 10 to 50%, more preferably from 15 to 40%, the resultant rubber compositions are balanced among tensile strength and heat build-up resistance at a higher level.

Examples 15 to 21, Comparative Example 4

Any of commercially available diene rubbers shown in Table 8, and/or Diene Rubber No. 4 and/or No. 12 prepared in Preparation Example 1, as raw rubber, and any of Polyether-based Polymers No. 1 and Nos. 3 to 6 prepared in Preparation Example 2 were used. On the basis of the formulation shown in Table 7, the whole amount of the raw rubber, a half amount of silica and a half amount of a silane coupling agent were mixed with one another at 170° C. for 2 minutes in a 250-ml Brabender mixer, and the remaining compounding agents except for sulfur and a vulcanization accelerator were then added to knead the mixture for 3 minuets at the same temperature.

After each of the mixtures thus obtained, sulfur and the vulcanization accelerator were then added to an open roll controlled at 50° C. to knead them, the kneaded mixture was press-vulcanized at 160° C. for 30 minutes to produce test pieces, thereby determining their various physical properties. The results are shown in Table 8.

TABLE 7

| Formulation 3 | First | Second | Third |
|---|---|---|---|
| Raw rubber | Whole | — | — |
| Silica (*1) | 30 | 30 | — |
| Silane coupling agent (*2) | 2 | 2 | — |
| Polyether-based-polymer | — | Varied | — |
| Diethylene glycol | — | Varied | — |
| Stearic acid | — | 2 | — |
| Zinc Oxide | — | 1 | — |
| Silicone oil | — | 10 | — |
| Wax | — | 5 | — |
| Antioxidant (*3) | — | 2 | — |
| Sulfur | — | — | 1.1 |
| Vulcanization accelerator (*4) | — | — | 0.5 |
| Vulcanization accelerator (*5) | — | — | 2 |

Note:
(*1) Z1165MP
(*2) Si69
(*3) Nocrac 6C
(*4) Nocceler D
(*5) Nocceler CZ

TABLE 8

| | Example | | | | | | | Comp. Ex. |
|---|---|---|---|---|---|---|---|---|
| | 15 | 16 | 17 | 18 | 19 | 20 | 21 | 4 |
| Raw rubber (parts) | | | | | | | | |
| Diene Rubber No. 4 | 75 | 75 | 75 | 75 | 75 | 75 | 75 | 75 |
| Diene Rubber No. 12 | — | — | — | — | — | 25 | — | — |
| BR1220 (*1) | 25 | 25 | 25 | 25 | 25 | — | — | 25 |
| NR (*2) | — | — | — | — | — | — | 25 | — |

TABLE 8-continued

|  | Example | | | | | | | Comp. Ex. |
|---|---|---|---|---|---|---|---|---|
|  | 15 | 16 | 17 | 18 | 19 | 20 | 21 | 4 |
| Polyether-based polymer (parts) | | | | | | | | |
| Polyether-based Polymer No. 1 | 3 | — | — | — | — | — | — | — |
| Polyether-based Polymer No. 3 | — | 3 | — | — | — | — | — | — |
| Polyether-based Polymer No. 4 | — | — | 3 | — | — | — | — | — |
| Polyether-based Polymer No. 5 | — | — | — | 5 | — | 5 | — | — |
| Polyether-based Polymer No. 6 | — | — | — | — | 5 | — | 5 | — |
| Diethylene glycol | — | — | — | — | — | — | — | 3 |
| Tensile strength index (*3) | 102 | 112 | 110 | 118 | 115 | 120 | 130 | 100 |
| Heat build-up index (*3) | 101 | 110 | 115 | 120 | 111 | 143 | 131 | 100 |
| Antistatic property | ○ | Δ | ○ | ○ | ○ | ○ | ○ | x |
| Processability | ○ | ○ | ○ | ○ | ○ | ○ | ○ | x |

Note:
(*1) Polybutadiene rubber [Mooney viscosity ($ML_{1+4}$, 100° C.) = 45; product of Nippon Zeon Co., Ltd.]
(*2) Natural rubber [Mooney viscosity ($ML_{1+4}$, 100° C.) = 60]
(*3) Expressed in terms of an index assuming that the value of Comparative Example 4 is 100.

As apparent from the results shown in Table 8, it is understood the rubber compositions (Examples 15 to 21) according to the present invention are excellent in all properties of tensile strength, heat build-up resistance and processability and are excellent to the full in antistatic property as well. It is also understood that when the polyether-based polymer compounded is a copolymer containing, as a comonomer, an unsaturated epoxide such as allyl glycidyl ether, properties of the resultant rubber compositions, such as tensile strength and heat build-up resistance, are markedly improved (Examples 16 to 21), that when the content of allyl glycidyl ether is 1 to 5 wt. %, the improving effects on these properties become highest (Examples 17 to 19), and that the use of the polyether-based polymer having a high ethylene oxide content results in the rubber compositions highly improved in antistatic property (Examples 15 and 17 to 21). On the other hand, the rubber composition (Comparative Example 4). to which diethylene glycol has been added in place of the polyether-based polymer, is poor in processability, is not sufficiently improved in tensile strength and heat build-up resistance and has no antistatic property as well.

Examples 22 and 23, Comparative Examples 5 and 6

A commercially available diene rubber shown in Table 10 and Diene Rubber No. 10 prepared in Preparation Example 1, as raw rubber, and Polyether-based Polymer No. 2 prepared in Preparation Example 2 were used. On the basis of the formulation shown in Table 9, the whole amount of the raw rubber, the whole amount of the polyether-based polymer, a half amount of silica and a half amount of a silane coupling agent were mixed with one another at 170° C. for 2 minutes in a 250-ml Brabender mixer, and the remaining compounding agents except for sulfur and a vulcanization accelerator were then added to knead the mixture for 3 minuets at the same temperature.

After each of the mixtures thus obtained, sulfur and the vulcanization accelerator were then added to an open roll controlled at 50° C. to knead them, the kneaded mixture was press-vulcanized at 160° C. for 30 minutes to produce test pieces, thereby determining their various physical properties. The results are shown in Table 10.

TABLE 9

| Formulation 4 | First | Second | Third |
|---|---|---|---|
| Raw rubber | Whole | — | — |
| Polyether-based polymer | Varied | — | — |
| Silica (*1) | Half | Half | — |
| Carbon black (*2) | — | Whole | — |
| Silane coupling agent (*3) | Half | Half | — |
| Stearic acid | — | 3 | — |
| Zinc oxide | — | 1 | — |
| Wax | — | 10 | — |
| Antioxidant (*4) | — | 10 | — |
| Sulfur | — | — | 1.5 |
| Vulcanization accelerator (*5) | — | — | 1.8 |

Note:
(*1) Z1165MP
(*2) Seast KH (product of Tokai Carbon *Co., Ltd.)
(*3) Si69; *8 wt. % of the amount of silica compounded
(*4) Nocrac 6C
(*5) Nocceler CZ

TABLE 10

|  | Example | | Comp. Example | |
|---|---|---|---|---|
|  | 22 | 23 | 5 | 6 |
| Raw rubber (parts) | | | | |
| Diene Rubber No. 10 | 80 | 80 | 80 | 80 |
| NR (*1) | 20 | 20 | 20 | 20 |
| Compounding component (parts) | | | | |
| Polyether-based Polymer No. 2 | 5 | 5 | — | — |
| Carbon black | 5 | 10 | 5 | 30 |
| Silica | 50 | 45 | 50 | 25 |
| Tensile strength index (*2) | 112 | 114 | 100 | 102 |
| Heat build-up index (*2) | 115 | 106 | 100 | 91 |
| Antistatic property | ○ | ○ | X | ○ |
| Processability | ○ | ○ | Δ | Δ |

Note:
(*1) Natural rubber [Mooney viscosity ($ML_{1+4}$, 100° C.) = 50]
(*2) Expressed in terms of an index assuming that the value of Comparative Example 5 is 100.

As apparent from the results shown in Table 10, it is understood the rubber compositions (Examples 22 and 23) according to the present invention are excellent in all properties of tensile strength, heat build-up resistance and processability and are excellent to the full in antistatic property as well. On the other hand, antistatic property can be improved by compounding carbon black even when no polyether-based polymer is added. However, such a rubber composition (Comparative Example 6) is not preferred because it is poor in heat build-up resistance, and is not sufficiently improved in tensile strength and processability.

INDUSTRIAL APPLICABILITY

According to the present invention, there are provided rubber compositions in which tensile strength and processability, which have hitherto been weak points of silica-compounded rubber materials, can be highly improved without impairing excellent rolling resistance (heat build-up resistance) which constitutes a feature of such rubber materials. In addition, the rubber compositions according to the present invention also have excellent antistatic property. Therefore, the rubber compositions according to the present invention can be used in various fields of applications, for example, various parts for tires, such as treads, carcasses, sidewalks and beads; rubber products such as hoses, window frames, belts, shoe soles, rubber vibration insulators and automobile parts; and further toughening rubbers for resins such as impact-resistant polystyrene and ABS resins, making good use of their excellent properties. Although the rubber compositions according to the present invention are suitable for use in, particularly, tire treads of fuel consumption-reducing tires making good use of their excellent properties, they are also suitable for use in tire treads, sidewalks, under treads, carcasses, beads and the like of all-season tires, high performance tires, studless tires, etc.

What is claimed is:

1. An ethylene oxide-propylene oxide-unsaturated epoxide terpolymer composed of 50 to 98.9 wt. % of ethylene oxide, 1 to 35 wt. % of propylene oxide and 0.1 to 15 wt. % of an unsaturated epoxide and having a Mooney viscosity ($ML_{1+4}$, 100° C.) of 70 to 150.

2. The ethylene oxide-propylene oxide-unsaturated epoxide terpolymer according to claim 1, which is composed of 60 to 97.5 wt. % of ethylene oxide, 2 to 30 wt. % of propylene oxide and 0.5 to 10 wt. % of an unsaturated epoxide.

3. The ethylene oxide-propylene oxide-unsaturated epoxide terpolymer according to claim 1, which is composed of 70 to 96 wt. % of ethylene oxide, 3 to 25 wt. % of propylene oxide and 1 to 5 wt. % of an unsaturated epoxide.

4. The ethylene oxide-propylene oxide-unsaturated epoxide terpolymer according to claim 1, which has a Mooney viscosity ($ML_{1+4}$, 100° C.) of 80 to 140.

5. The ethylene oxide-propylene oxide-unsaturated epoxide terpolymer according to claim 1, which has a Mooney viscosity ($ML_{1+4}$, 100° C.) of 85 to 120.

6. The ethylene oxide-propylene oxide-unsaturated epoxide terpolymer according to claim 1, wherein the unsaturated epoxide is an alkenyl glycidyl ether.

* * * * *